United States Patent
Lee et al.

(10) Patent No.: US 9,240,068 B2
(45) Date of Patent: Jan. 19, 2016

(54) THREE-DIMENSIONAL IMAGE PROCESSING APPARATUS AND CALIBRATION METHOD OF THE SAME

(71) Applicant: LG Electronics Inc., Seoul (KR)

(72) Inventors: Jaekwang Lee, Seoul (KR); Hongrae Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 13/682,845

(22) Filed: Nov. 21, 2012

(65) Prior Publication Data

US 2013/0127842 A1  May 23, 2013

(30) Foreign Application Priority Data

Nov. 22, 2011 (KR) .......... 10-2011-0122145

(51) Int. Cl.
*G06T 15/00* (2011.01)
*H04N 13/04* (2006.01)
*G02B 27/22* (2006.01)

(52) U.S. Cl.
CPC ............ *G06T 15/00* (2013.01); *G02B 27/2214* (2013.01); *H04N 13/0404* (2013.01);
(Continued)

(58) Field of Classification Search
CPC .. G02B 27/225; G02B 27/22; G02B 27/2228; G02B 7/023; G02B 27/2214; G02B 27/0093; H04N 13/0454; H04N 13/0022; H04N 13/0246; H04N 13/0425; H04N 13/0484; H04N 1/00087; H04N 13/0404; H04N 13/0409; H04N 13/0413; H04N 13/0048; H04N 13/0278; H04N 13/0402; H04N 13/0475; H04N 13/0477; H04N 13/0481; H04N 13/0468; H04N 13/0436; H04N 5/7441; G09G 2320/02; G09G 2320/0606; G09G 3/003; G02F 1/1396
USPC ......................................................... 345/419
See application file for complete search history.

(56) References Cited

U.S. PATENT DOCUMENTS 5,712,732 A * 1/1998 Street ............................ 359/630
5,959,663 A   9/1999 Oba et al. ........................ 348/46
(Continued)

FOREIGN PATENT DOCUMENTS

EP   0 769 881   4/1997
EP   0 829 743   3/1998
(Continued)

OTHER PUBLICATIONS

Chinese Office Action issued in corresponding foreign Application Serial No. 201210597073.4 dated Jul. 8, 2014.
(Continued)

*Primary Examiner* — Haixia Du
(74) *Attorney, Agent, or Firm* — Ked & Associates, LLP

(57) ABSTRACT

A three-dimensional image processing apparatus and a calibration method of the same are disclosed. A display device displays two or more view images. A three-dimensional image filter is disposed at the front of the display device. The three-dimensional image filter has transmission regions and non-transmission regions which are alternately arranged. A controller adjusts positions of the non-transmission regions of the three-dimensional image filter based on a current position of a user and a reference switch mode. Upon detecting a user action to request movement of the non-transmission regions, the controller changes the reference switch mode in response to the user action and adjusts the positions of the non-transmission regions of the three-dimensional image filter based on the changed reference switch mode.

18 Claims, 22 Drawing Sheets

(52) U.S. Cl.
CPC ....... *H04N13/0409* (2013.01); *H04N 13/0425* (2013.01); *H04N 13/0468* (2013.01); *H04N 13/0497* (2013.01); *H04N 13/0477* (2013.01)

(56) References Cited

U.S. PATENT DOCUMENTS

| | | | |
|---|---|---|---|
| 5,959,664 | A | 9/1999 | Woodgate ........................ 348/59 |
| 7,619,815 | B2 * | 11/2009 | Nam et al. ..................... 359/464 |
| 2008/0316302 | A1 | 12/2008 | Vos et al. .......................... 348/51 |
| 2010/0060983 | A1 | 3/2010 | Wu et al. ....................... 359/466 |
| 2010/0189413 | A1 * | 7/2010 | Yoshino .......................... 386/83 |
| 2011/0032252 | A1 | 2/2011 | Ohta |
| 2011/0211049 | A1 * | 9/2011 | Bassali et al. ................... 348/51 |
| 2012/0044330 | A1 * | 2/2012 | Watanabe ....................... 348/54 |
| 2012/0200680 | A1 * | 8/2012 | So et al. .......................... 348/54 |
| 2014/0036047 | A1 * | 2/2014 | Watanabe et al. ............... 348/54 |

FOREIGN PATENT DOCUMENTS

| | | |
|---|---|---|
| EP | 0 833 183 | 4/1998 |
| EP | 1 087 627 | 3/2001 |
| WO | WO 2007/072330 | 6/2007 |

OTHER PUBLICATIONS

European Search Report issued in related Application No. 12007876.1 dated Nov. 22, 2013.
Partial European Search Report issued in Application No. 12007876.1 dated Aug. 1, 2013.
European Office Action issued in Application No. 12 007 876.1 dated Mar. 20, 2015.

* cited by examiner

FIG. 9
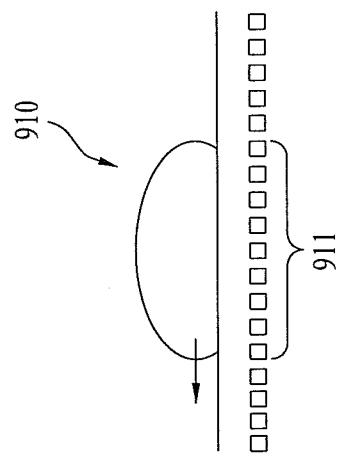
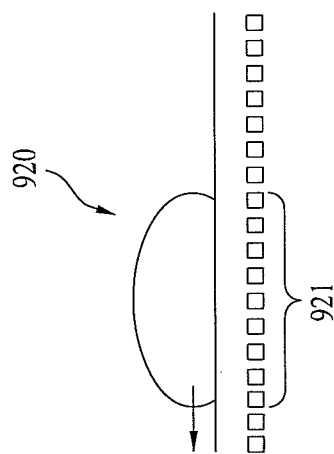
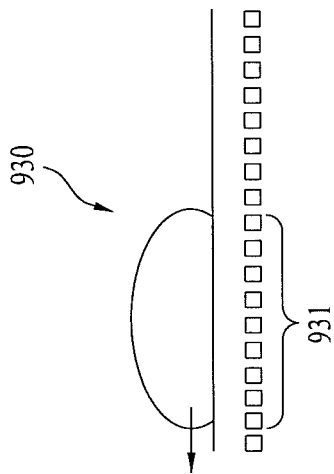

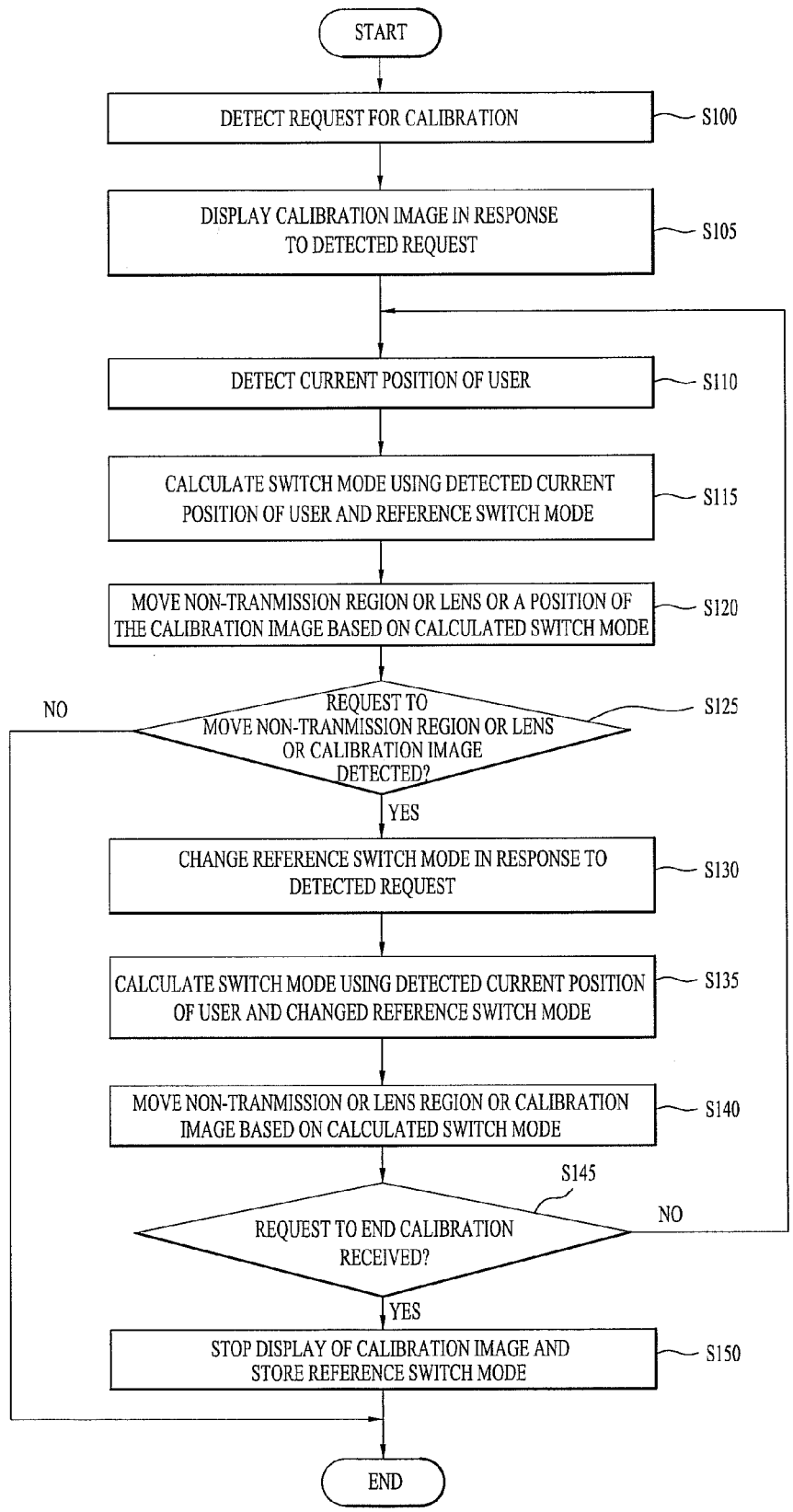

THREE-DIMENSIONAL IMAGE PROCESSING APPARATUS AND CALIBRATION METHOD OF THE SAME

CROSS-REFERENCE TO RELATED APPLICATION(S)

This application claims priority under 35 U.S.C. §119 to Korean Application No. 10-2011-0122145 filed in Korea on Nov. 22, 2011, whose entire disclosure is hereby incorporated by reference.

BACKGROUND

1. Field

The present disclosure relates to a three-dimensional image processing apparatus and a method of calibrating the same.

2. Background

Three-dimensional image processing apparatuses and methods of calibrating the same are known. However, they suffer from various disadvantages. In addition to content which displays a two-dimensional image based on a two-dimensional image signal, content which displays a three-dimensional image based on a three-dimensional image signal has been planned and produced as broadcast content. A method of displaying a three-dimensional image may use a principle of binocular disparity by which a viewer experiences a three-dimensional effect due to binocular disparity. Such a method may be classified as a shutter glass method, a glassless method, or a full three-dimensional method. In particular, in the glassless method, a region in which a user can view a three-dimensional image without image flipping and cross-talk is limited. Consequently, it is desirable to control the display of a three-dimensional image based on a position of the user.

BRIEF DESCRIPTION OF THE DRAWINGS

The embodiments will be described in detail with reference to the following drawings in which like reference numerals refer to like elements, wherein:

FIG. 9 is a diagram illustrating a movement of a lens in a lenticular fashion;

FIG. 17 is a flow chart of a calibration method according to an embodiment of the present disclosure.

DETAILED DESCRIPTION

Figure 1:
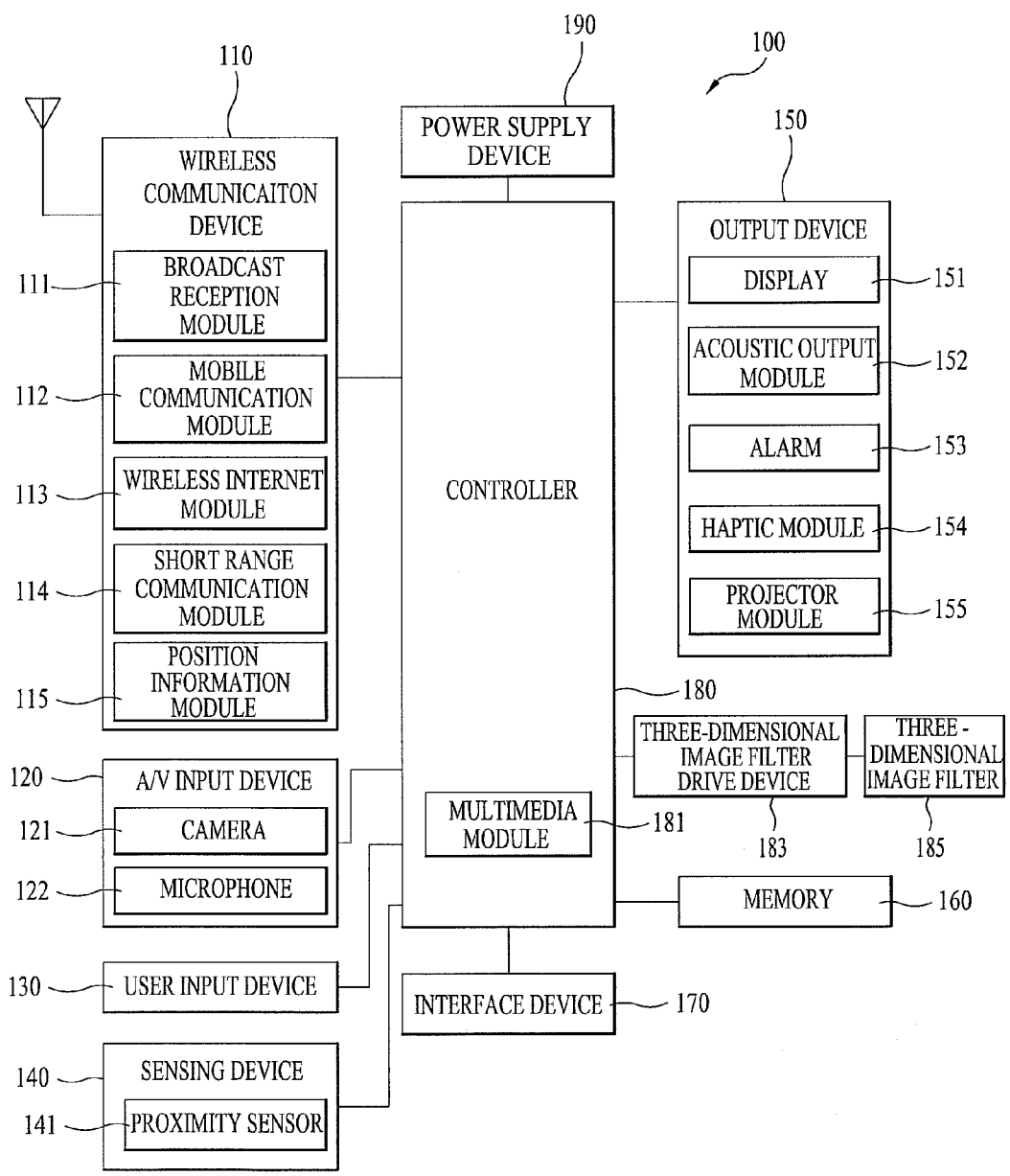
FIG. 1 is a block diagram of a three-dimensional image processing apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Hereinafter, the exemplary embodiments of the present disclosure will be described with reference to the accompanying drawings. The configuration and action of the present disclosure shown in the drawings and described with reference to the drawings will be described as at least one embodiment; however, the technical idea and the core configuration and action of the present disclosure are not limited thereto.

Although the terms used in the present disclosure are selected from generally known and widely used terms in consideration of function in the present disclosure, terms used herein may be varied depending on operator's intention or customs in the art, emergence new technology, or the like. Also, some of the terms mentioned in the description of the present disclosure have been selected by the applicant at his or her discretion, the detailed meanings of which are described in relevant parts of the description herein. Therefore, the terms used in the present disclosure should be defined not based on the names of the terms but based on the meanings of the terms and the detailed description of the present disclosure.

A three-dimensional image processing apparatus described in this specification may include mobile terminals, such as a mobile phone, a smart phone, a laptop computer, a digital broadcasting terminal, a personal digital assistant (PDA), a portable multimedia player (PMP), a navigator, or the like. Although embodiments of the present disclosure described in this specification are applied to such mobile terminals, it will be apparent to those skilled in the art that the embodiments of the present disclosure can be applied to stationary terminals, such as a digital TV or a desktop computer.

FIG. 1 is a block diagram of a three-dimensional image processing apparatus according to an embodiment of the present disclosure. The three-dimensional image processing apparatus 100 may include a wireless communication device 110, an audio/video (A/V) input device 120, a user input device 130, a sensing device 140, an output device 150, a memory 160, an interface device 170, a controller 180, a three-dimensional image filter drive device 183, a three-dimensional image filter 185 and a power supply device 190. The components shown in FIG. 1 are not indispensible. Consequently, the three-dimensional image processing apparatus may include more than or less than the components as listed above.

Hereinafter, the above-mentioned components will be described one by one.

The wireless communication device 110 may include one or more modules to enable wireless communication between the three-dimensional image processing apparatus 100 and a wireless communication system or between the three-dimensional image processing apparatus 100 and a network in which the three-dimensional image processing apparatus 100 is located. For example, the wireless communication device 110 may include a broadcast reception module 111, a mobile communication module 112, a wireless Internet module 113, a short range communication module 114 and a position information module 115.

The broadcast reception module 111 receives broadcast signals and/or broadcast-related signals from an external broadcast management server through broadcast channels. The broadcast channels may include satellite channels and terrestrial channels. The broadcast management server may be a server to generate broadcast signals and/or broadcast-related information and to transmit the generated broadcast signals and/or broadcast-related information or a server to receive pre-generated generate broadcast signals and/or broadcast-related information and to transmit the received broadcast signals and/or broadcast-related information to terminals. The broadcast signals may include TV broadcast signals, radio broadcast signals and data broadcast signals. In addition, the broadcast signals may include broadcast signals formed by combining data broadcast signals with TV broadcast signals or radio broadcast signals. Also, the TV broadcast signals may include two-dimensional image broadcast signals and three-dimensional image broadcast signals.

The broadcast-related information may be information regarding broadcast channels, broadcast programs, broadcast service providers, or another appropriate type of information. The broadcast-related information may be provided through a mobile network. In this case, the broadcast-related information may be received by the mobile communication module 112.

The broadcast-related information may be provided in various forms. For example, the broadcast-related information may be provided in the form of an electronic program guide (EPG) of digital multimedia broadcasting (DMB) or an electronic service guide (ESG) of digital video broadcast-handheld (DVB-H).

The broadcast reception module 111 may receive digital broadcast signals using digital broadcasting systems, such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Of course, the broadcast reception module 111 may be configured to be suitable for the above-mentioned digital broadcasting systems and other different broadcasting systems.

Broadcast signals and/or broadcast-related information received by the broadcast reception module 111 may be stored in the memory 160.

The mobile communication module 112 may transmit and receive wireless signals to and from at least one selected from among a base station, an external terminal and a server via a mobile communication network. The wireless signals may include speech call signals, video communication call signals or various forms of data based on transmission and receipt of text/multimedia messages.

The wireless Internet module 113 is a module for wireless Internet connection. The wireless Internet module 113 may be mounted inside or outside the three-dimensional image processing apparatus 100. Wireless LAN (WLAN), wireless fidelity (Wi-Fi), wireless broadband (WiBro), world interoperability for microwave access (WiMax), high speed downlink packet access (HSDPA) or the like may be used as wireless Internet technology.

The short range communication module 114 is a module for short range communication. Bluetooth, radio frequency identification (RFID), infrared data association (IrDA), ultra wideband (UWB), ZigBee or the like may be used as short range communication technology.

The position information module 115 is a module to acquire positions of the three-dimensional image processing apparatus. A representative model of the position information module 115 is a global position system (GPS) module.

The A/V input device 120 is provided to input audio signals or video signals. The A/V input device 120 may include a camera 121 and a microphone 122. The camera 121 may process image frames, such as still images or moving images, acquired by an image sensor in a video communication mode or in a shooting mode. The processed image frames may be displayed on the display device 151.

The image frames captured by the camera 121 may be processed by the controller 180, stored in the memory 160, or transmitted to an external device via the wireless communication device 110. According to circumstances, two or more cameras 121 may be provided.

The microphone 122 receives external acoustic signals and processes the received acoustic signals into electrical speech data in a communication mode or a recording mode and a speech recognition mode. In the communication mode, the processed speech data may be converted and output in a form transmittable to a mobile communication base station through the mobile communication module 112. Various noise removal algorithms to remove noise generated during input of external acoustic signals into the microphone 122 may be incorporated in the microphone 122.

The user input device 130 allows a user to input commands to control the operation of a terminal. The user input device 130 may include a key pad, a dome switch, a touch pad (static pressure/electrostatic), a jog wheel, a jog switch or another appropriate interface.

The sensing device 140 senses a current state of the three-dimensional image processing apparatus 100, such as an open and closed state of the three-dimensional image processing apparatus 100, a position of the three-dimensional image processing apparatus 100, whether user contact has been occurred, a direction of the three-dimensional image processing apparatus 100, acceleration/deceleration of the three-dimensional image processing apparatus 100 or the like to generate a sensing signal to control the operation of the three-dimensional image processing apparatus 100. For example, in a case in which the three-dimensional image processing apparatus 100 is a slide phone, the sensing device 140 may sense whether the slide phone has been opened or closed.

Also, the sensing device 140 may sense whether power has been supplied from the power supply device 190 and whether the interface device 170 has been coupled to an external device. Meanwhile, the sensing device 140 may include a proximity sensor 141.

The output device 150 may generate output related to visual sensation, auditory sensation or tactile sensation. The output device 150 may include a display device 151, an acoustic output module 152, an alarm device 153, a haptic module 154, a projector module 155, or another appropriate type of output interface.

The display device 151 may display (output) information processed by the three-dimensional image processing apparatus 100. For example, when the three-dimensional image processing apparatus 100 is in a communication mode, the display device 151 may display a user interface (UI) or a graphical user interface (GUI) related to communication. When the three-dimensional image processing apparatus 100 is in a video communication mode or an image capture mode, the display device 151 may display captured and/or received images, a UI or a GUI. When the three-dimensional image processing apparatus 100 is in a broadcast signal display mode or an image display mode, the display device 151 may display broadcast signals or stored image data.

The display device 151 may include at least one display selected from among a liquid crystal display (LCD), a thin film transistor-liquid crystal display (TFT-LCD), an organic light emitting diode (OLED), a flexible display and a three-dimensional display (3D display), or another appropriate type of display.

Some of these displays may be configured into a transparent type or light transmission type displays, through which the outside can be seen. These displays may be referred to as transparent displays. A representative of the transparent displays is a transparent OLED (TOLED). The rear structure of the display device 151 may also be configured into a light transmission type structure. In this structure, it is possible for a user to view objects located at the rear of the terminal body through a region occupied by the display device 151 of the terminal body.

Depending upon how the three-dimensional image processing apparatus 100 is realized, two or more display devices 151 may be provided. For example, the three-dimensional image processing apparatus 100 may be configured so that a plurality of display devices is disposed on a single plane in a state in which the display devices are spaced apart from each other or are in one deviceed body or so that the display devices are disposed on different planes.

In a case in which the display device 151 and a sensor to sense a touch operation (hereinafter, referred to as a 'touch sensor') constitute a layered structure (hereinafter, referred to as a 'touch screen'), the display device 151 may be used as an input device as well as an output device. For example, the touch sensor may be configured in the form of a touch film, touch sheet, touch pad or the like.

The touch sensor may be configured to convert the change of pressure applied to a specific region of the display device 151 or the change of capacitance generated in a specific region of the display device 151 into an electric input signal. The touch sensor may be configured to sense touch pressure as well as a touched position and area.

When touch input has been performed with respect to the touch sensor, a corresponding signal(s) is transmitted to a touch controller. The touch controller processes the signal(s) and transmits data corresponding to the processed signal(s) to the controller 180. Consequently, the controller 180 can determine which region of the display device 151 has been touched.

The proximity sensor 141 may be disposed at an inner region of the three-dimensional image processing apparatus 100 and surrounded by the touch screen or in the vicinity of the touch screen. The proximity sensor may sense whether an object has approached a predetermined sensing surface or is present in the vicinity of the predetermined sensing surface using electromagnetic force or infrared rays without mechanical contact. The proximity sensor may have a longer lifespan and higher applicability than a contact type sensor.

Examples of the proximity sensor 141 may include a transmission type photoelectric sensor, direct reflection type photoelectric sensor, mirror reflection type photoelectric sensor, high frequency oscillation type proximity sensor, capacitive type proximity sensor, magnetic type proximity sensor, infrared proximity sensor, or the like. In a case in which the touch screen is of an electrostatic type, the touch screen is configured to sense an approach of a pointer based on change in an electric field caused by the approach of the pointer. In this case, the touch screen (touch sensor) may be classified as a proximity sensor.

In the following description, an action in which a pointer approaches the touch screen without contact and it is recognized that the pointer is located on the touch screen is referred to as "proximity touch" and an action in which a pointer directly contacts the touch screen is referred to as "contact touch" for convenience of description. A position at which proximity touch of the pointer is performed on the touch screen is a position at which the pointer corresponds substantially perpendicular to the touch screen when the proximity touch of the pointer is performed.

The proximity sensor 141 senses a proximity touch operation and proximity touch patterns (for example, a proximity touch distance, a proximity touch direction, proximity touch velocity, a proximity touch time, a proximity touch position, proximity touch movement, etc.). Information corresponding to the sensed proximity touch operation and proximity touch patterns may be output on the touch screen.

The acoustic output module 152 may output audio data received from the wireless communication device 110 or stored in the memory 160 in a call signal reception mode, a communication mode, a recording mode, a speech recognition mode, a broadcast reception mode, or the like. The acoustic output module 152 may output acoustic signals related to functions (for example, call signal reception sound, message reception sound, etc.) executed by the three-dimensional image processing apparatus 100. The acoustic output module 152 may include a receiver, speaker, buzzer, or another appropriate acoustic device.

The alarm device 153 may output signals to notify that events have been generated in the three-dimensional image processing apparatus 100. Examples of events generated in the three-dimensional image processing apparatus 100 may include call signal reception, message reception, key signal input, touch input, or the like. The alarm device 153 may output other different signals, for example vibration signals to notify of event generation in addition to video signals and audio signals. The video signals and audio signals may also be output through the display device 151 or the speech output module 152. Consequently, the display device 151 or the speech output module 152 may be classified as a part of the alarm device 153.

The haptic module 154 may generate various tactile effects that a user can feel. A representative example of the tactile effects generated by the haptic module 154 is vibration. It is possible to control intensity and patterns of vibration generated by the haptic module 154. For example, different kinds of vibration may be output in a synthesized state or may be sequentially output.

In addition to vibration, the haptic module 154 may generate various tactile effects, such as stimulative effects caused by the arrangement of pins movable perpendicularly to the skin with which the pins are in contact, injection force or suction force of air through an injection port or a suction port, rubbing against the skin, contact with an electrode, electrostatic force, etc. and effects through reproduction of cold and warm sensation using endothermic or exothermic elements.

The haptic module 154 may be configured to transmit tactile effects through direct contact and, in addition, for a user to feel tactile effects through sensation of muscles, such as fingers or arms. Depending upon how the three-dimensional image processing apparatus 100 is configured, two or more haptic modules 154 may be provided.

The projector module 155 is a component to perform an image projection function using the three-dimensional image processing apparatus 100. The projector module 155 may display an image identical to or partially different from the image displayed on the display device 151 on an external screen or wall according to a control signal of the controller 180.

Specifically, the projector module 155 may include a light source to generate light (for example, laser light) necessary to output an image to the outside, an image generation device to generate an image to be output to the outside using the light generated by the light source, and a lens to output the image from a predetermined focal distance to the outside in an enlarged state. Also, the projector module 155 may include a device to mechanically move the lens of the entirety of the module to control an image projection direction.

Depending upon kinds of display devices, the projector module 155 may be classified as a cathode ray tube (CRT) module, a liquid crystal display (LCD) module, a digital light processing (DLP) module, or the like. In particular, the DLP module is configured so that light generated from the light source is reflected by digital micromirror device (DMD) chips to project the generated image in an enlarged state. Consequently, the DLP module may be advantageous in reducing the site of the projector module 151.

The projector module 155 may be provided at the side, front or rear of the three-dimensional image processing apparatus 100 in the longitudinal direction thereof. Of course, the projector module 155 may be provided at any position of the three-dimensional image processing apparatus 100 as needed.

The memory 160 may store programs necessary for the controller 180 to perform processing and control and, in addition, temporarily store input/output data (for example, telephone directories, messages, audio, still images, moving images, etc.) The memory 160 may also store frequency of use of the data (for example, frequency of use of each telephone number, each message and each piece of multimedia). Also, the memory 160 may store data related to various patterns of vibration and sound output upon performing touch input on the touch screen.

Figure 14:
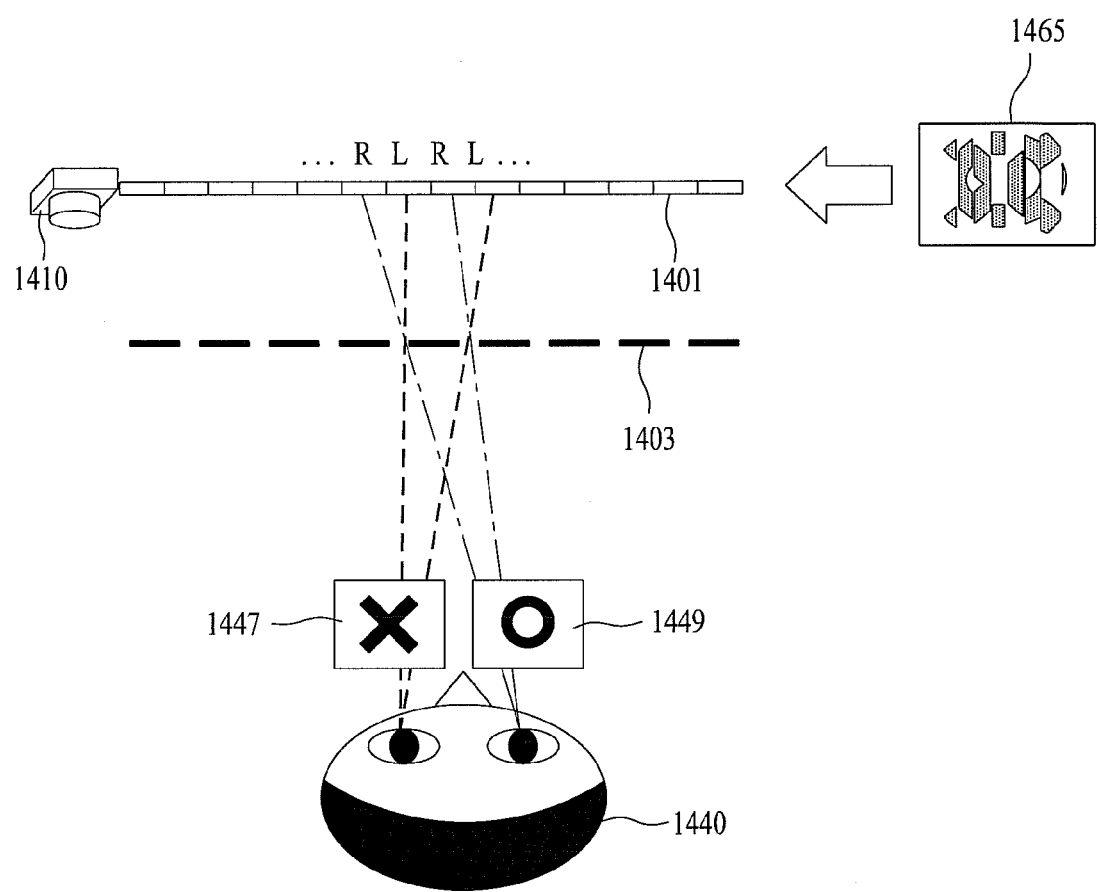
FIG. 14 is a view showing a calibration method according to a further embodiment of the present disclosure.

The memory 160 may store an arrangement standard image (also calibration image). The arrangement standard image is a three-dimensional image frame used for calibration. The three-dimensional image frame may be an image frame including a plurality of pieces of view image data. That is, the arrangement standard image may be an image frame that includes two or more view images, which have different colors or patterns. For example, an arrangement standard image 1265 of FIG. 12 may include a left view image 1267 and a right view image 1269. The left view image 1267 may have a white color, and the right view image 1269 may have a black color. Alternatively, the left view image 1267 may have a blue color, and the right view image 1269 may have a green color. In another example, an arrangement standard image 1465 may include a left view image 1447 and a right view image 1449, as illustrated in FIG. 14. The left view image 1447 may have an X-shaped pattern, and the right view image 1449 may have a circular pattern.

Also, the arrangement standard image may include view images, the number of which may be varied depending upon the number of view images to be displayed by a manufactured three-dimensional image display apparatus. For example, in a case in which the manufactured three-dimensional image display apparatus displays 15 view images, the arrangement standard image may include 15 view images.

The memory 160 may include at least one selected from among a flash memory type memory, a hard disk type memory, a multimedia card micro type memory, a card type memory (for example, SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or another appropriate type of storage device. The three-dimensional image processing apparatus 100 may be operated in connection with a web storage, which performs a storage function of the memory 160 over the Internet.

The interface device 170 serves as a path to external devices connected to the three-dimensional image processing apparatus 100. Through the interface device 170, data from the external devices may be received by the three-dimensional image processing apparatus 100, power supplied to the components of the three-dimensional image processing apparatus 100, or data transmitted from the three-dimensional image processing apparatus 100 to the external devices. For example, a wired/wireless headset port, an external charger port, a wired/wireless data port, a memory card port, a port to connect a device having an identification module, an audio input/output (I/O) port, a video I/O port, an earphone port, etc. may be included in the interface device 170.

The identification module is a chip which stores various kinds of information necessary to authenticate a user of the three-dimensional image processing apparatus 100. The identification module may include a user identity module (UIM), a subscriber identity module (SIM) and a universal scriber identity module (USIM). A device having such an identification module (hereinafter, referred to as an 'identification device') may be manufactured in the form of a smart card. Consequently, the identification device can be connected to the three-dimensional image processing apparatus 100 through the port.

The interface device 170 may be a path through which power from an external cradle is supplied to the three-dimensional image processing apparatus 100 when the three-dimensional image processing apparatus 100 is connected to the cradle or a path through which various command signals input by a user through the cradle are transmitted to the mobile terminal. Various command signals or power input from the cradle may be operated as a signal to recognize that the mobile terminal has been correctly mounted in the cradle.

The controller 180 may control overall operations of the three-dimensional image processing apparatus 100. For example, the controller 180 may perform control and processing related to speech communication, data communication, video communication, etc. The controller 180 may include a multimedia module 181 to reproduce multimedia. The multimedia module 181 may be incorporated in the controller 180 or may be configured separately from the controller 180.

The controller 180 may perform pattern recognition processing to recognize handwriting input or drawing input performed on the touch screen as text and images. Also, the controller 180 may detect user action and control a command or operation corresponding to the detected user action to be performed. The user action may include selection of a physical button of the three-dimensional image processing apparatus 100 or a remote control, execution of a predetermined gesture on the touch screen or selection of a soft button on the touch screen, execution of a predetermined gesture recognized from images captured by the camera 121, execution of a predetermined speech recognized by speech recognition, or the like.

The controller 180 may receive image frames in which a user image has been captured from the camera 121 and detect a position of the user using the received image frames. In some embodiments, the controller 180 may calculate a position of a three-dimensional image filter based on the detected position of the user. Here, the position of the three-dimensional image filter may be a position of a barrier or a position of the lens.

Also, the controller 180 may calculate a difference value between the calculated position of the three-dimensional image filter and the current position of the three-dimensional image filter to calculate an amount of movement of the three-dimensional image filter. Here, the amount of movement of the three-dimensional image filter may be an amount of movement of the barrier or an amount of movement of the lens.

The controller 180 may calculate velocity of movement of the user using at least one selected from among the current detected position of the user and the previously detected position of the user. Also, the controller 180 may estimate a position of the user when a predetermined time elapses using the detected position of the user and the calculated velocity of movement of the user and calculate a position of the three-dimensional image filter and an amount of movement of the three-dimensional image filter based on the estimated position of the user.

The controller 180 may generate a control signal requesting movement of the three-dimensional image filter based on the calculated position of the three-dimensional image filter or the calculated amount of movement of the three-dimensional image filter and may output the generated control signal to the three-dimensional image filter drive device 183.

The three-dimensional image filter drive device 183 may control movement of the barrier or the lens of the three-dimensional image filter 185 based on the position of the three-dimensional image filter calculated by the controller 180. The three-dimensional image filter drive device 183 may calculate a difference value between the position of the three-dimensional image filter calculated by the controller 180 and the current position of the three-dimensional image filter to calculate an amount of movement of the three-dimensional image filter, and may control movement of the barrier or the lens based on the calculated amount of movement of the three-dimensional image filter.

In some embodiments, the three-dimensional image filter drive device 183 may control movement of a transmission region (e.g., translucent region) and a non-transmission region (e.g., opaque region) of the three-dimensional image filter 185 based on a position of the non-transmission region calculated by the controller 180. In some embodiments, the three-dimensional image filter drive device 183 may control movement of the lens of the three-dimensional image filter 185 based on the position of the lens calculated by the controller 180. Here, the transmission region is a region of the three-dimensional image filter through which light is transmitted, and the non-transmission region is a region of the three-dimensional image filter through which light is not transmitted. Also, the non-transmission region may be a region occupied by the barrier.

The three-dimensional image filter 185 is a filter to enable a user to view two or more view images displayed on the display device 151 as three-dimensional images. That is, the three-dimensional image filter 185 controls optical paths of view images displayed by the display device 151. Controlling optical paths of view images may mean interrupting optical paths of some of the view images or refracting the view images. Here, the three-dimensional image filter 185 may be a liquid crystal parallax barrier or a liquid crystal lenticular filter.

In some embodiments, the three-dimensional image filter 185 may include transmission regions and non-transmission regions arranged at predetermined intervals. Light emitted from the display device 151 passes through the transmission regions and reaches the right eye or the left eye of a user. In a case in which the three-dimensional image filter 185 is the liquid crystal parallax barrier, the non-transmission regions may be constituted by barriers. A pair of transmission and non-transmission regions may be referred to as a pitch. The transmission regions and the non-transmission regions of the three-dimensional image filter 185 may be moved under control of the three-dimensional image filter drive device 183. At this time, the three-dimensional image filter 185 may be fixed to the three-dimensional image processing apparatus 100. Also, the three-dimensional image filter 185 may have a plurality of switch modes to indicate the positions of the non-transmission regions. That is, the three-dimensional image filter 185 may have a switch mode to indicate the position of each of the non-transmission regions.

In some embodiments, in a case in which the three-dimensional image filter 185 is the liquid crystal lenticular filter, the transmission regions and the non-transmission regions may be divided from each other by lenses. One lens may be referred to as a pitch. The lenses of the three-dimensional image filter 185 may be moved under control of the three-dimensional image filter drive device 183. At this time, the three-dimensional image filter 185 may be fixed to the three-dimensional image processing apparatus 100. Also, the three-dimensional image filter 185 may have a plurality of switch modes to indicate the positions of the lenses. That is, the three-dimensional image filter 185 may have a switch mode to indicate the position of each of the lenses.

The power supply device 190 supplies external power or internal power to the respective components of the three-dimensional image processing apparatus under control of the controller 180.

Various embodiments described herein may be realized in recording media, which can be read from a computer or a device similar thereto, for example, using software, hardware or a combination thereof.

In a hardware type realization, embodiments described herein may be realized using at least one selected from among application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or another appropriate type of device. Embodiments described herein may be realized using the controller 180.

In a software type realization, embodiments such as procedures and functions described herein may be realized using additional software modules. The software modules may perform one or more functions and operations described herein. Software code may be realized using a software application written using an appropriate programming language. The software code may be stored in the memory 160 and may be executed by the controller 180.

Figure 2:
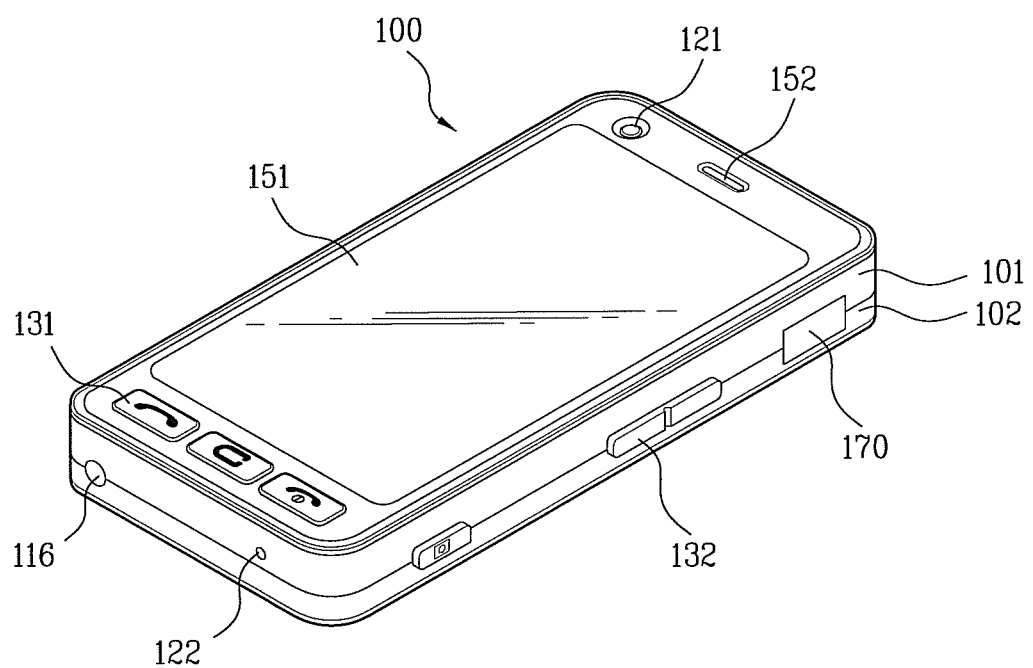
FIG. 2 is a front perspective view of a three-dimensional image processing apparatus according to an embodiment of the present disclosure.

FIG. 2 is a front perspective view of a three-dimensional image processing apparatus according to an embodiment of the present disclosure. The three-dimensional image processing apparatus 100 is shown to have a bar type terminal body. However, embodiments of the present disclosure are not limited thereto. Embodiments of the present disclosure may be applied to various structures, such as a slide type structure, a folder type structure, a swing type structure, a swivel type structure, or the like, in which two or more bodies are coupled to each other so that the bodies can move relative to each other.

The body includes a case (casing, housing, cover, etc.) forming the external appearance thereof. In this embodiment, the case may be divided into a front case 101 and a rear case 102. Various electronic parts are mounted in a space defined between the front case 101 and the rear case 102. At least one intermediate case may be further provided between the front case 101 and the rear case 102. The cases may be formed through injection molding of a synthetic resin or may be formed of a metal material, such as stainless steel (STS) or titanium (Ti).

The display device 151, the acoustic output device 152, the camera 121, the user input device 130 (131 and 132), the microphone 122, and the interface device 170 may be disposed at the terminal body, particularly at the front case 101.

The display device 151 may occupy a major portion of the main surface of the front case 101. The acoustic output device 152 and the camera 121 may be disposed at a region of the front case 101 adjacent to one end of the display device 151. The three-dimensional image filter 185 may be disposed at one end of the display device 151. The three-dimensional image filter 185 may be bonded to one end of the display device 151. The user input device 131 and the microphone 122 may be disposed at a region of the front case 101 adjacent to the other end of the display device 151. The user input device 131 and the interface device 170 may be disposed at sides of the front case 101 and the rear case 102.

The user input device 130 may allow a user to input a command to control the operation of the three-dimensional image processing apparatus 100. The user input device 130 may include a plurality of manipulation devices 131 and 132. The manipulation devices 131 and 132 may be generally referred to as a manipulation portion. Any type of manipulation devices 131 and 132 may be adopted as long as a user can manipulate the manipulation devices 131 and 132 while having a tactile sensation.

Content input via the first or second manipulation device 131 or 132 may be variously set. For example, the first manipulation device 131 may allow a user to input commands such as start, end and scroll, and the second manipulation device 132 may allow a user to input commands to adjust the volume of sound output from the acoustic output device 152 or switch to a touch recognition mode of the display device 151.

Figure 3:
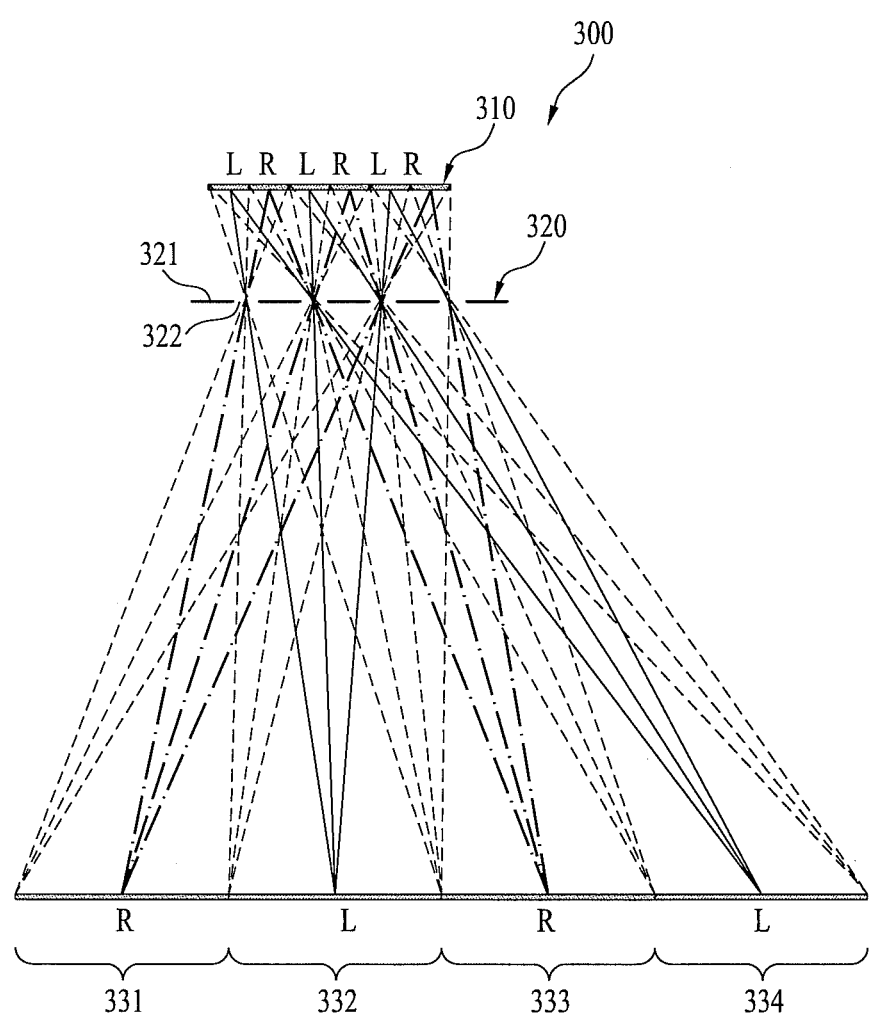
FIG. 3 is a diagram showing the disposition of a three-dimensional image filter according to an embodiment of the present disclosure.

FIG. 3 is a diagram showing the disposition of a three-dimensional image filter according to an embodiment of the present disclosure. A three-dimensional image panel 300 may include a display panel 310 to display a three-dimensional image constituted by a mixture of left view images L and right view images R and a three-dimensional image filter 320 having non-transmission regions 321 and transmission regions 322 which are arranged at predetermined intervals. Here, the three-dimensional image filter 320 may be a liquid crystal parallax barrier. Meanwhile, the display device 151 of FIG. 1 may be the display panel 310, and the three-dimensional image filter 185 of FIG. 1 may be the three-dimensional image filter 320.

The three-dimensional image filter 320 may be disposed in front of the display panel 310 so that the three-dimensional image filter 320 is spaced from the display panel 310 by a predetermined distance. The non-transmission regions 321 and the transmission regions 322 may be alternately arranged in the direction parallel to the display panel 310.

The display panel 310 displays view images corresponding to the left eye L and the right eye R, and the displayed left view images L and right eye view images R may be viewed through the three-dimensional image filter 320. The left eye and the right eye of the user may independently view the corresponding left view images L and the right view images R provided on the display panel 310. As a result, the user may experience a three-dimensional effect.

A spot where the user can view the three-dimensional image well is called a sweet spot. That is, the sweet spot may be a spot where left view images L and right view images R do not overlap, e.g., cross-talk does not occur, and left view images L and right view images R are not flipped, e.g., image flipping does not occur. The sweet spot where the left view images L are seen well may be points 332 and 334, and the sweet spot where the right view images R are seen well may be points 331 and 333. If the right eye of the user is located at the points 332 or 334 and the left eye of the user is located at the points 331 or 333, image flipping may occur (e.g., the perceived 3D effect may be inverted).

Figure 4:
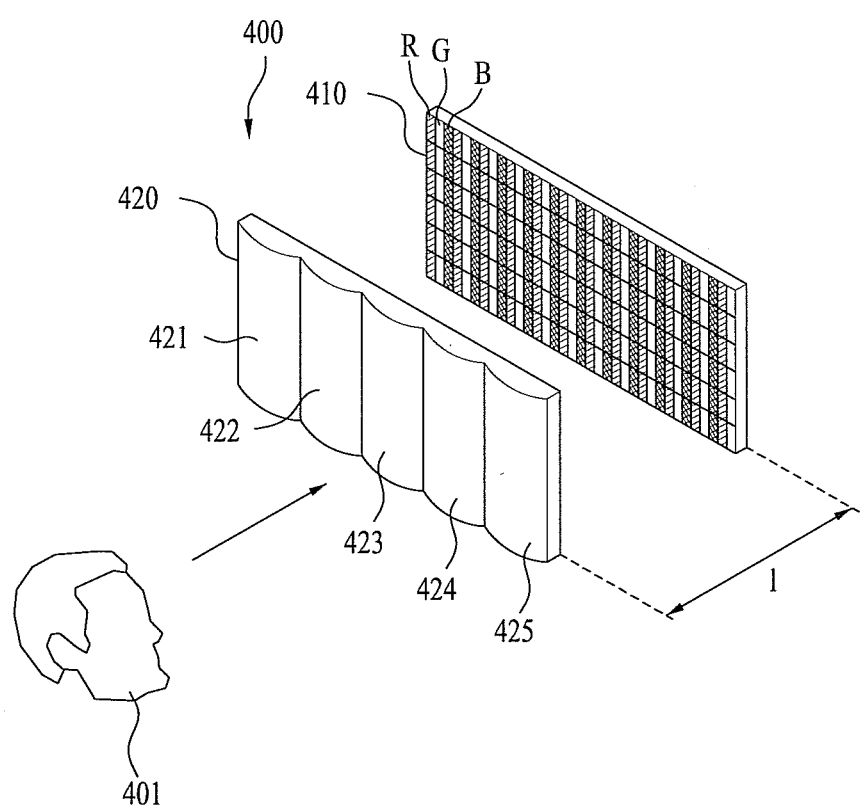
FIG. 4 is a perspective view showing the disposition of a three-dimensional image filter according to an embodiment of the present disclosure.

FIG. 4 is a perspective view showing the disposition of a three-dimensional image filter according to another embodiment of the present disclosure. A three-dimensional image panel 400 may include a display panel 410 to display a three-dimensional image constituted by a mixture of left view images L and right view images R and a three-dimensional image filter 420 having a plurality of lenses. The display device 151 of FIG. 1 may be the display panel 410, and the three-dimensional image filter 185 of FIG. 1 may be the three-dimensional image filter 420.

The three-dimensional image filter 420 may be disposed in front of the display panel 410. In this case, the three-dimensional image filter 420 may be spaced from the display panel 410 by a predetermined distance l so that images are placed on focal planes of the lenses.

The three-dimensional image filter 420 may be a lenticular filter. In this case, the lens 421, the lens 422, the lens 423, the lens 424 and the lens 425 of the three-dimensional image filter 420 may be liquid crystal lenses.

Figure 5:
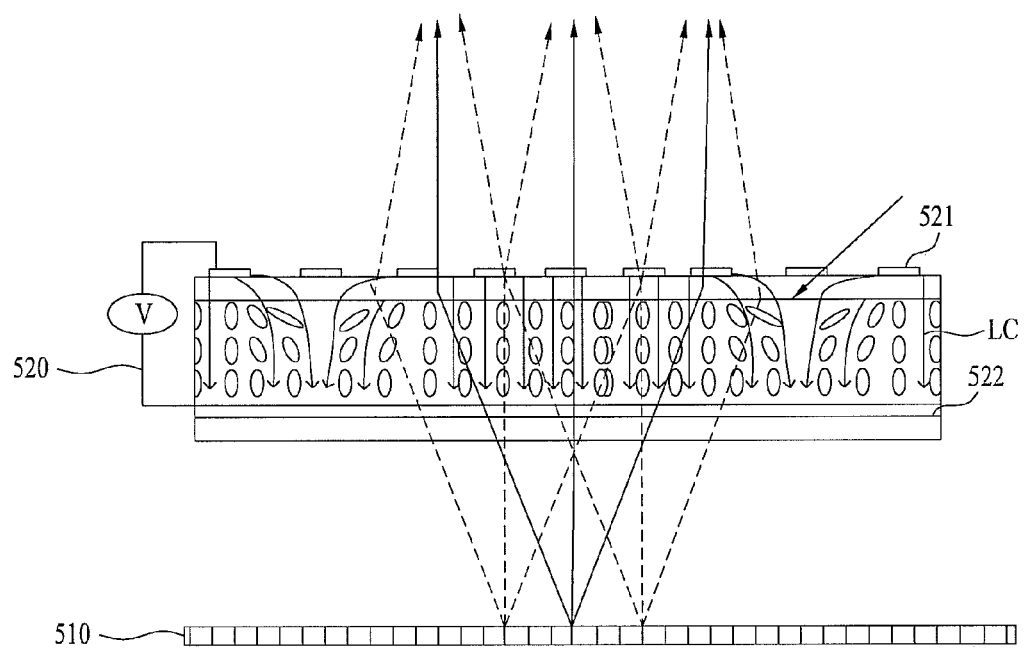
FIG. 5 is a diagram illustrating a principle of a liquid crystal lenticular filter.

FIG. 5 is a diagram illustrating a principle of a liquid crystal lenticular filter. A liquid crystal lenticular filter 520 may include transparent electrodes (ITO) 521 and 522 and a liquid crystal LC disposed between the transparent electrodes. The liquid crystal lenticular filter 520 may adjust refraction of light emitted from the display panel 510 through the liquid crystal LC so that view images are placed at appropriate sweet spots. That is, the liquid crystal LC constitutes lenses to refract light. The liquid crystal lenticular filter 520 may adjust voltage applied to the transparent electrodes (ITO) to adjust the position, direction and disposition of the liquid crystal LC. Depending upon the position, direction and disposition of the liquid crystal LC, the positions of the lenses may be changed, and therefore, the sweet spots may be changed.

Figure 6A:
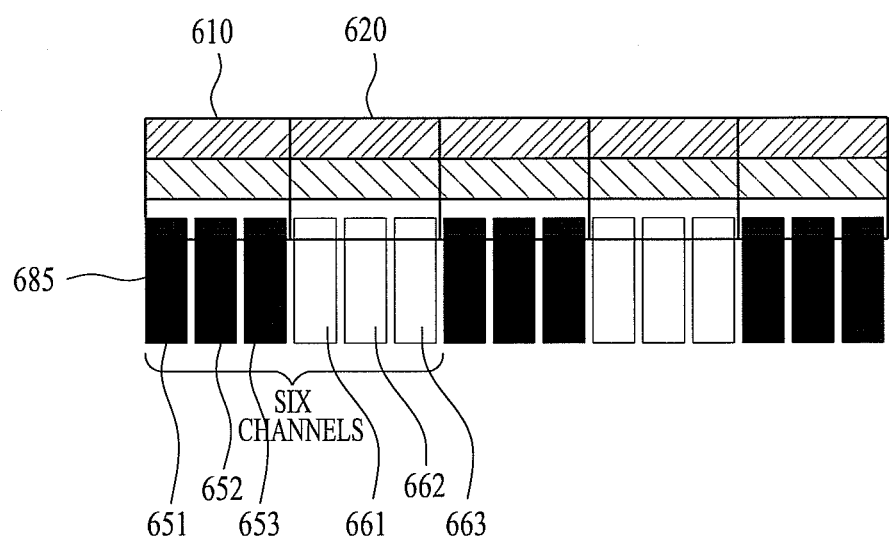
FIG. 6A is a diagram illustrating a six-channel three-dimensional image filter according to an embodiment of the present disclosure.

FIG. 6A is a diagram illustrating a six-channel three-dimensional image filter according to an embodiment of the present disclosure. The number of channels of a three-dimensional image filter 185 may mean a number of barriers corresponding to two pixels of the display device 151. The number of switch modes may be set based on the number of channels of the three-dimensional image filter. In some embodiments, the number of channels may mean the number of barriers corresponding to two sub-pixels of the display device 151.

Among the barriers of the three-dimensional image filter 685, three barriers 651, 652 and 653 may correspond to a pixel 610 of the display device 151, and three barriers 661, 662 and 663 may correspond to a pixel 620 of the display device 151. Consequently, the number of channels of the three-dimensional image filter 685 may be 6, and the three-dimensional image filter 685 may have six channels. Also, the three barriers 651, 652 and 653 may form a non-transmission region, and the three barriers 661, 662 and 663 may form a transmission region.

Figure 6B:
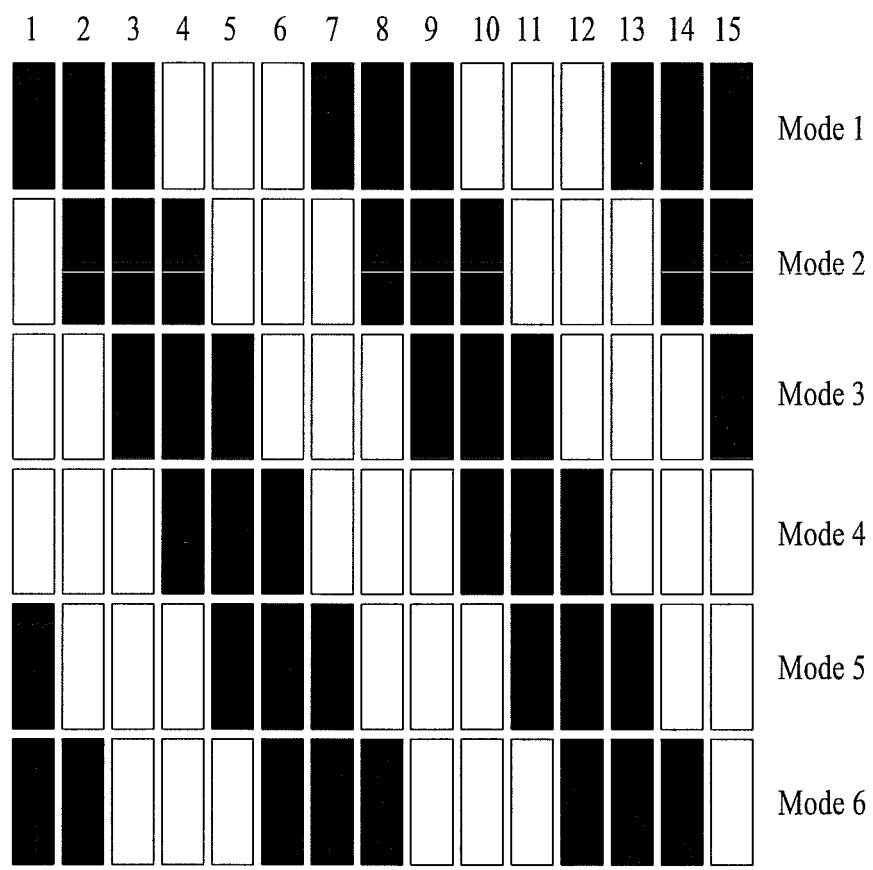
FIG. 6B is a diagram illustrating switch modes of the three-dimensional image filter of FIG. 6A.

FIG. 6B is a diagram illustrating switch modes of the three-dimensional image filter of FIG. 6A. The six-channel three-dimensional image filter may have six switch modes (Mode 1, Mode 2, Mode 3, Mode 4, Mode 5 and Mode 6).

In the first switch mode (Mode 1), barriers 1, 2 and 3, barriers 7, 8 and 9, and barriers 13, 14 and 15 may form non-transmission regions, and barriers 4, 5 and 6 and barriers 10, 11 and 12 may form transmission regions.

In the second switch mode (Mode 2), the barriers 2, 3 and 4, the barriers 8, 9 and 10, and the barriers 14 and 15 may form non-transmission regions, and the barrier 1, the barriers 5, 6 and 7, and the barriers 11, 12 and 13 may form transmission regions. The second switch mode (Mode 2) may be a mode in which each of the non-transmission regions are moved by the width of each barrier with respect to the first switch mode (Mode 1).

In the third switch mode (Mode 3), the barriers 3, 4 and 5, the barriers 9, and 11, and the barrier 14 may form non-transmission regions, and the barriers 1 and 2, the barriers 6, 7 and 8, and the barriers 12, 13 and 14 may form transmission regions. The third switch mode (Mode 3) may be a mode in which each of the non-transmission regions are moved by the width of each barrier with respect to the second switch mode (Mode 2).

In the fourth switch mode (Mode 4), the barriers 4, 5 and 6 and the barriers 10, 11 and 12 may form non-transmission regions, and the barriers 1, 2 and 3, the barriers 7, 8 and 9, and the barriers 13, 14 and 15 may form transmission regions. The fourth switch mode (Mode 4) may be a mode in which each of the non-transmission regions are moved by the width of each barrier with respect to the third switch mode (Mode 3).

In the fifth switch mode (Mode 5), the barrier 1, the barriers 5, 6 and 7, and the barriers 11, 12 and 13 may form non-transmission regions, and the barriers 2, 3 and 4, the barriers 8, 9 and 10, and the barriers 14 and 15 may form transmission regions. The fifth switch mode (Mode 5) may be a mode in which each of the non-transmission regions are moved by the width of each barrier with respect to the fourth switch mode (Mode 4).

In the sixth switch mode (Mode 6), the barriers 1 and 2, the barriers 6, 7 and 8, and the barriers 12, 13 and 14 may form non-transmission regions, and the barriers 3, 4 and 5, the barriers 9, 10 and 11, and the barrier 15 may form transmission regions. The sixth switch mode (Mode 6) may be a mode in which each of the non-transmission regions are moved by the width of each barrier with respect to the fifth switch mode (Mode 5).

Figure 7A:
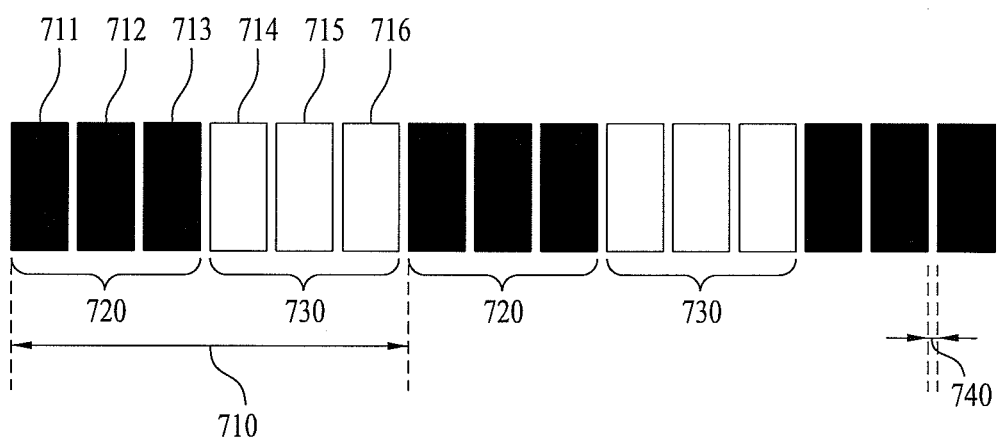
FIG. 7A is a diagram illustrating an electrode structure of the six-channel three-dimensional image filter.

FIG. 7A is a diagram illustrating an electrode structure of the six-channel three-dimensional image filter. A pitch may be divided into a plurality of device electrodes. A pitch 710 may include six device electrodes 711 to 716. The three device electrodes 711, 712 and 713 may form a non-transmission region 720, and the three device electrodes 714, 715 and 716 may form a transmission region 730. Also, a device electrode may a barrier. For example, the device electrode 711 corresponds to a barrier 1 of FIG. 8B.

Also, each device electrode may form a non-transmission region or a transmission region depending upon whether voltage is applied to the device electrodes. In a case in which each liquid crystal cell of the three-dimensional image filter is in a normal black mode, voltage may be applied to each device electrode to form a transmission region, or application of voltage to each device electrode may be stopped to form a non-transmission region. For example, when voltage is applied to the device module 711, the barrier 1 of the FIG. 8 may form a transmission region. When application of voltage to the device electrode 711 is stopped, the barrier 1 of the FIG. 8 may form a non-transmission region.

Also, in a case in which each liquid crystal cell of the three-dimensional image filter is in a normal white mode, voltage may be applied to each device electrode to form a non-transmission region, or application of voltage to each device electrode may be stopped to form a transmission region. For example, when voltage is applied to the device module 711, the barrier 1 of the FIG. 8 may form a non-transmission region. When application of voltage to the device electrode 711 is stopped, the barrier 1 of the FIG. 8 may form a transmission region.

An electrode gap 740 may be provided between the respective device electrodes. In a case in which each liquid crystal cell of the three-dimensional image filter is in a normal black mode, a space corresponding to the electrode gap 740 may be black since voltage of the electrode gap 740 remains off. On the other hand, in a case in which each liquid crystal cell of the three-dimensional image filter is in a normal white mode, the space corresponding to the electrode gap 740 may be white since voltage of the electrode gap 740 remains off. As a result, light leakage through the electrode gap 740 may occur. Also, cross-talk may occur due to such light leakage.

A black matrix BM may be applied to prevent light leakage through the electrode gap 740. For example, the black matrix BM may be applied when the area of one electrode gap is 1% or more that of one barrier.

Figure 7B:
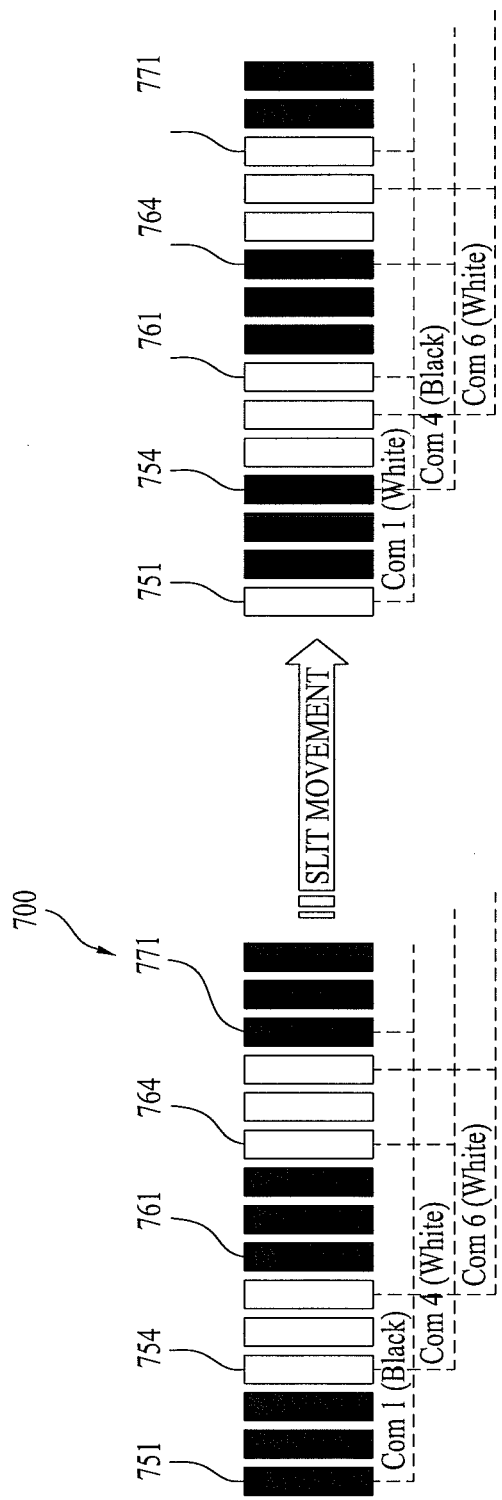
FIG. 7B is a diagram illustrating a movement of non-transmission regions of the six-channel three-dimensional image filter of FIG. 6A.

FIG. 7B is a diagram illustrating movement of the non-transmission regions of the six-channel three-dimensional image filter. In a case in which each pitch includes six barriers, the electrodes may be repeatedly driven in order of the six barriers. For example, to move each barrier, first barriers 751, 761 and 771 of pitches are charged from black (on in a normal white mode and off in a normal black mode) to white, and fourth barriers 754 and 764 of the pitches are charged from white (off in the normal white mode and on in the normal black mode) to black.

A three-dimensional image filter 700 may be configured so that barriers located at the same positions on the pitches can be simultaneously controlled. That is, electrodes of the barriers located at the same positions on the pitches may be commonly connected on the panel so that the electrodes can be simultaneously controlled. For example, the electrodes may be connected on a flexible printed circuit (FPC) so that the electrode can be driven simultaneously. Consequently, it is possible to reduce manufacturing costs and drive-related costs, to reduce power consumption, and to simplify the circuit as compared with a case in which all of the device electrodes are individually driven.

Figure 8A:
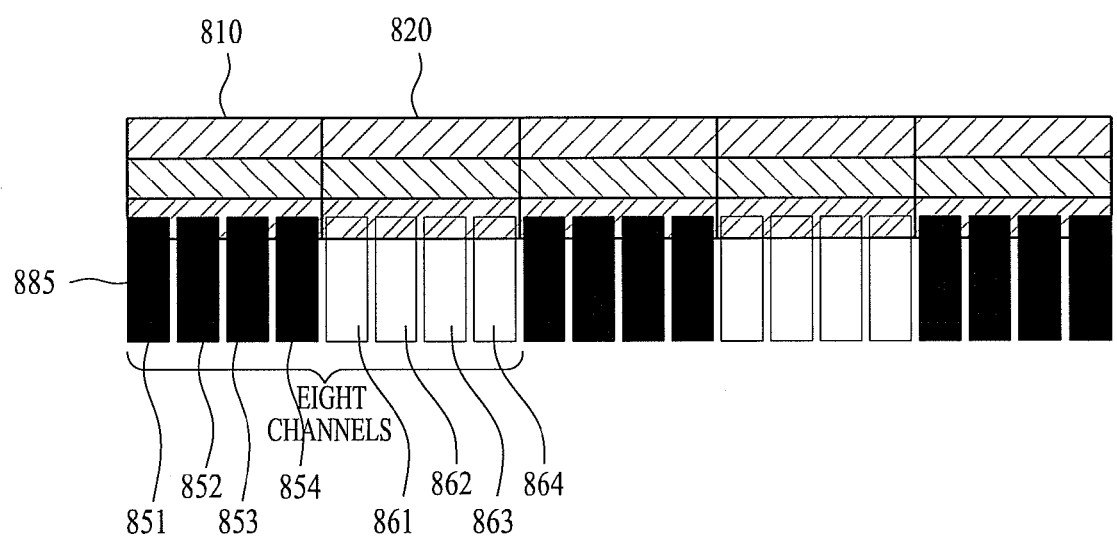
FIG. 8A is a diagram illustrating an eight-channel three-dimensional image filter according to an embodiment of the present disclosure.

FIG. 8A is a diagram illustrating an eight-channel three-dimensional image filter according to an embodiment of the present disclosure. Among barriers of a three-dimensional image filter 885, four barriers 851, 852, 853 and 854 may correspond to a pixel 810 of the display device 151, and four barriers 861, 862, 863 and 864 may correspond to a pixel 820 of the display device 151. Consequently, the number of channels of the three-dimensional image filter 885 may be 8, and the three-dimensional image filter 685 may have eight channels.

Figure 8B:
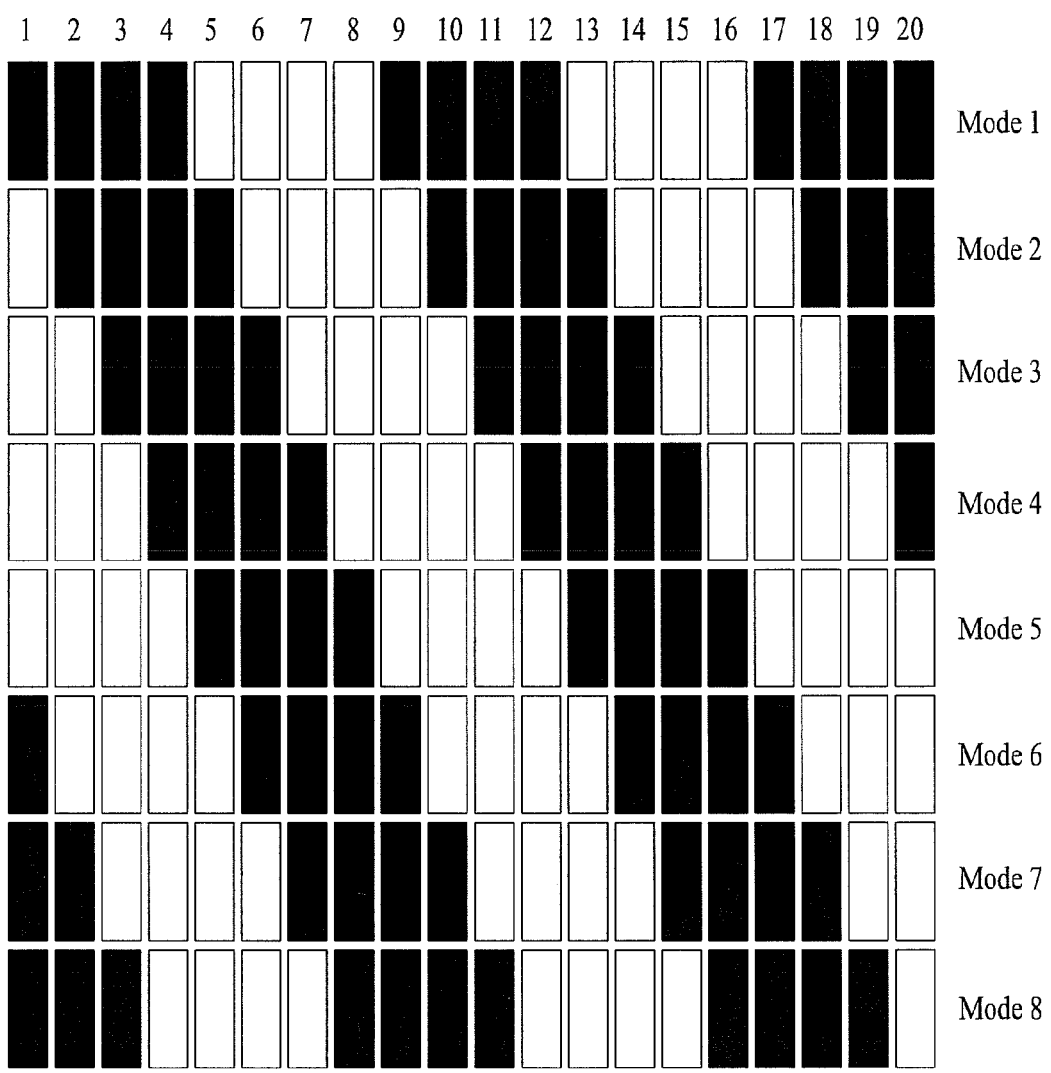
FIG. 8B is a diagram illustrating switch modes of the three-dimensional image filter of FIG. 8A.

FIG. 8B is a diagram illustrating switch modes of the three-dimensional image filter of FIG. 8A. The eight-channel three-dimensional image filter may have eight switch modes (Mode 1, Mode 2, Mode 3, Mode 4, Mode 5, Mode 6, Mode 7 and Mode 8).

In the first switch mode (Mode 1), barriers 1, 2, 3 and 4, barriers 9, 10, 11 and 12, and barriers 17, 18, 19 and 20 may form non-transmission regions, and barriers 5, 6, 7 and 8 and barriers 13, 14, 15 and 16 form transmission regions.

In the second switch mode (Mode 2), the barriers 2, 3, 4 and 5, the barriers 10, 11, 12 and 13, and the barriers 18, 19 and 20 may form non-transmission regions, and the barrier 1, the barriers 6, 7, 8 and 9, and the barriers 14, 15, 16 and 17 may form transmission regions. The second switch mode (Mode 2) may be a mode in which each of the non-transmission regions are moved by the width of each barrier with respect to the first switch mode (Mode 1).

The third switch mode (Mode 3) may be a mode in which each of the non-transmission regions is moved by the width of each barrier with respect to the second switch mode (Mode 2), the fourth switch mode (Mode 4) may be a mode in which each of the non-transmission regions is moved by the width of each barrier with respect to the third switch mode (Mode 3), and the fifth switch mode (Mode 5) may be a mode in which each of the non-transmission regions is moved by the width of each barrier with respect to the fourth switch mode (Mode 4).

Also, the sixth switch mode (Mode 6) may be a mode in which each of the non-transmission regions is moved by the width of each barrier with respect to the fifth switch mode (Mode 5), the seventh switch mode (Mode 7) may be a mode in which each of the non-transmission regions is moved by the width of each barrier with respect to the sixth switch mode (Mode 6), and the eighth switch mode (Mode 8) may be a mode in which each of the non-transmission regions is moved by the width of each barrier with respect to the seventh switch mode (Mode 7).

FIG. 9 is a diagram illustrating a movement of a lens in a lenticular fashion. In the three-dimensional image filter 185, an electrode of a device lens may include a predetermined number of divided device electrodes. When a voltage corresponding to the shape of a lens to be formed is uniformly applied to the device electrodes, a refractive index of a liquid crystal is changed to form a lens. Voltage may be applied to nine device electrodes 911 to form a lens 910. Also, the lens 910 may be a device lens having a transmission region and a non-transmission region which can be divided from each other. The lens 910 may form a pitch. The transmission region and the non-transmission region may be moved according to movement of such a device lens.

The three-dimensional image filter drive device 183 may adjust a voltage applied to the device electrodes to move the device lens. That is, the three-dimensional image filter drive device 183 may apply a voltage, applied to the device electrodes to form a device lens, to device electrodes moved by the number of the device electrodes having lengths corresponding to a movement amount to form another device lens at a position where the device lens has been moved by the movement amount. For example, when voltage, applied to the nine device electrodes 911 forming the lens 910, is applied to nine device electrodes 921 moved from the device electrodes 911 by two device electrodes, the lens 910 may be moved to a position of a lens 920 located to the left by a length corresponding to two device electrodes. In another example, when voltage, applied to the nine device electrodes 921 forming the lens 920, is applied to nine device electrodes 931 moved from the device electrodes 921 by one device electrode, the lens 920 may be moved to a position of a lens 930 located to the left by a length corresponding to one device electrode.

Figure 10:
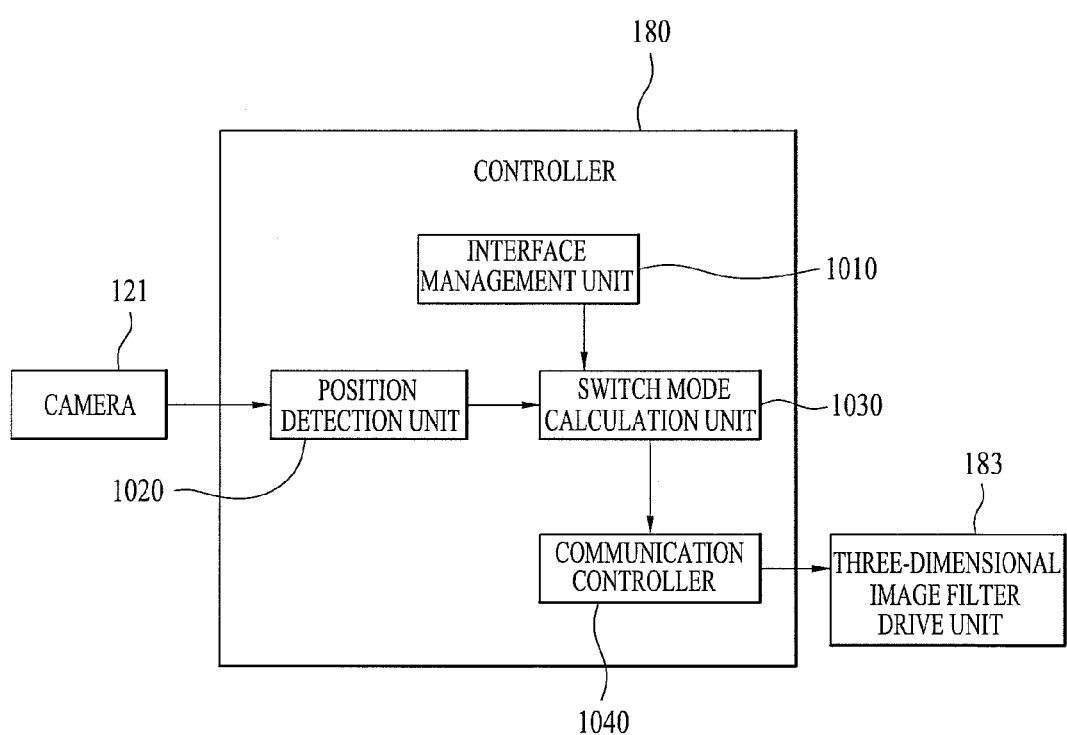
FIG. 10 is a block diagram of a controller according to an embodiment of the present disclosure.

FIG. 10 is a block diagram of a controller according to an embodiment of the present disclosure. The controller 180 may include an interface management device 1010, a position detection device 1020, a switch mode calculation device 1030, and a communication controller 1040.

The position detection device 1020 receives image frames in which a user image has been captured from the camera 121 and detects a position of the user using the received image frames. The position detection device 1020 may recognize a face region to detect the position of the user. Here, the position detection device 1020 may recognize the face region using an algorithm based on symmetry of a face, an algorithm based on hair color and face color, and an algorithm based on the contour of a face. Also, the position detection device 1020 may calculate skin color information from the image frames to recognize the face region.

The switch mode calculation device 1030 may calculate a switch mode based on the position of the user detected by the position detection device 1020 and a reference switch mode. Here, the reference switch mode may be set during manufacture of the three-dimensional image processing apparatus 100 or may be changed according to a user action to request movement of the reference switch mode.

The switch mode calculation device 1030 may calculate the switch mode using mathematical expression 1 below:

$$M=R+(P/S)C \qquad (1)$$

where, R indicates a reference switch mode, P indicates a position of a user, S indicates a step size, C indicates the number of switch modes. The position of the user may indicate a position relative to a reference user position in the reference switch mode. That is, P may be a distance between the reference user position and a current user position. The distance may be a pixel length. Also, the step size may mean a movement amount of the user position in which switching between the switch modes does not occur. Alternatively, the step size may be a width of a sweet spot. For example, the step size may be a width of a sweet spot 1116. P and S may be displayed as the same length device. For example, P and S may be displayed as a pixel length. That is, P and S may have a pixel length calculated from the captured image frame.

In one embodiment, the switch mode calculation device 1030 may generate a control signal to control movement of the non-transmission region of the three-dimensional image filter to a position indicated by the calculated switch mode and may output the generated control signal to the communication controller 1040. Here, the calculated switch mode may be a switch mode indicating the position of a non-transmission region in which a point at which the user is positioned becomes a sweet spot. The generated control signal may be a signal to control movement of the non-transmission region to a position indicated by the calculated switch mode.

In one embodiment, the switch mode calculation device 1030 may generate a control signal to control movement of the lens of the three-dimensional image filter to a position indicated by the calculated switch mode and may output the generated control signal to the communication controller 1040. Here, the calculated switch mode may be a switch mode indicating the position of a lens in which a point at which the user is positioned becomes a sweet spot. The generated control signal may be a signal to control movement of the lens to a position indicated by the calculated switch mode.

The communication controller 1040 may transmit the control signal generated by the switch mode calculation device 1030 to the three-dimensional image filter drive device 183. The communication controller 1040 may output the control signal to the three-dimensional image filter drive device 183 in an I2C communication fashion.

Figure 11:
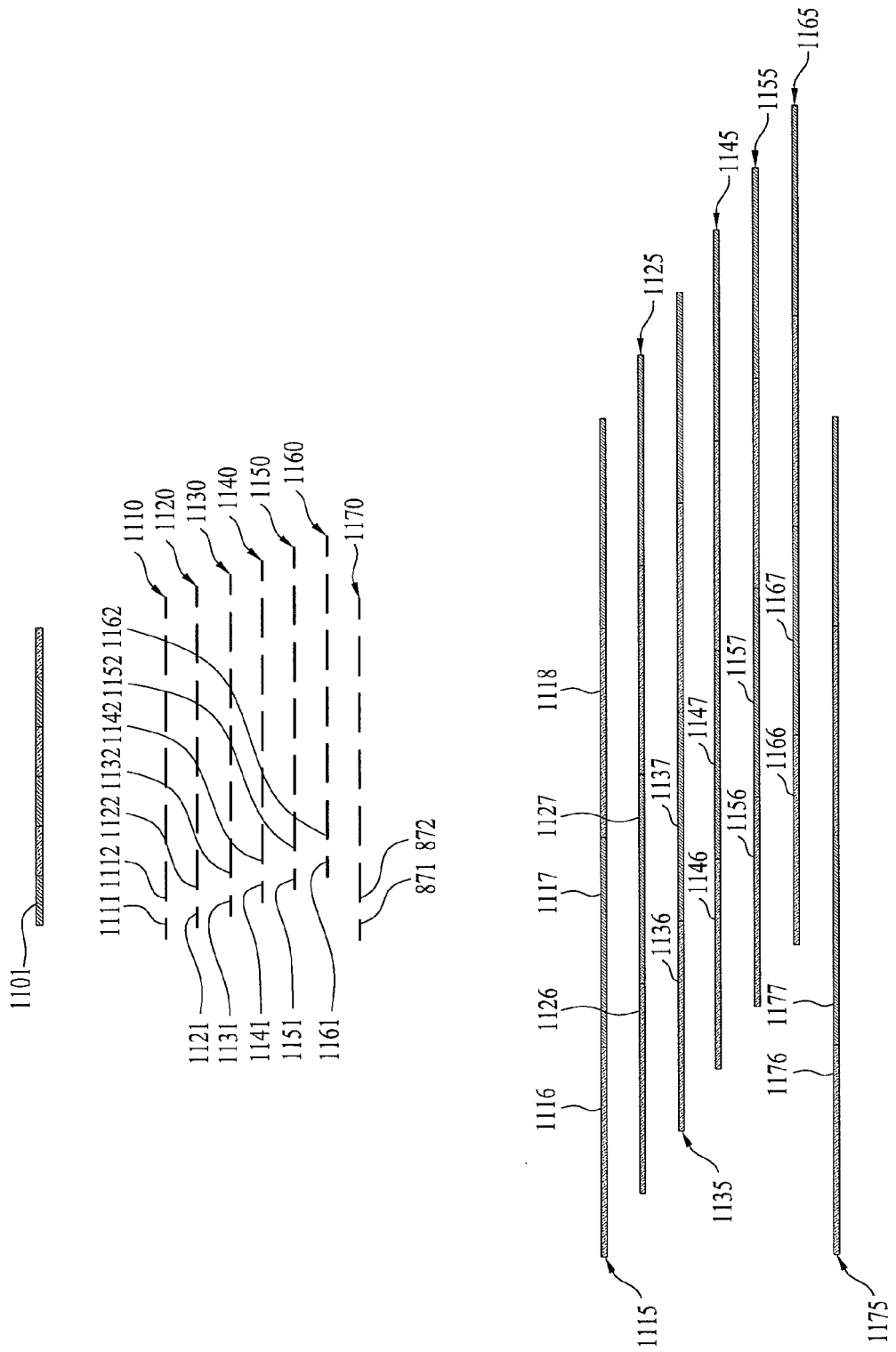
FIG. 11 is a diagram illustrating a movement of a sweet spot based on a change in position of a three-dimensional image filter.

FIG. 11 is a diagram illustrating a movement of a sweet spot based on the change in position of a three-dimensional image filter. In a three-dimensional image filter 1110 having a switch mode in which non-transmission regions 1111 and transmission regions 1112 are arranged, there is provided a sweet spot 1115 in which sweet spots 1117 to enable a user to view left view images L displayed on a display panel 1101 and sweet spots 1116 to enable the user to view right view images R displayed on the display panel 1101 are alternately arranged.

In a three-dimensional image filter 1120 having a switch mode in which non-transmission regions 1121 and transmission regions 1122 are arranged, there is provided a sweet spot 1125 in which sweet spots 1127 to enable the user to view left view images L displayed on the display panel 1101 and sweet spots 1126 to enable the user to view right view images R displayed on the display panel 1101 are alternately arranged.

In a three-dimensional image filter 1130 having a switch mode in which non-transmission regions 1131 and transmission regions 1132 are arranged, there is provided a sweet spot 1135 in which sweet spots 1137 to enable the user to view left view images L displayed on the display panel 1101 and sweet spots 1136 to enable the user to view right view images R displayed on the display panel 1101 are alternately arranged.

In a three-dimensional image filter 1140 having a switch mode in which non-transmission regions 1141 and transmission regions 1142 are arranged, there is provided a sweet spot 1145 in which sweet spots 1147 to enable the user to view left view images L displayed on the display panel 1101 and sweet spots 1146 to enable the user to view right view images R displayed on the display panel 1101 are alternately arranged.

In a three-dimensional image filter 1150 having a switch mode in which non-transmission regions 1151 and transmission regions 1152 are arranged, there is provided a sweet spot 1155 in which sweet spots 1157 to enable the user to view left view images L displayed on the display panel 1101 and sweet spots 1156 to enable the user to view right view images R displayed on the display panel 1101 are alternately arranged.

In a three-dimensional image filter 1160 having a switch mode in which non-transmission regions 1161 and transmission regions 1162 are arranged, there is provided a sweet spot 1165 in which sweet spots 1167 to enable the user to view left view images L displayed on the display panel 1101 and sweet spots 1166 to enable the user to view right view images R displayed on the display panel 1101 are alternately arranged.

In a three-dimensional image filter 1170 having a switch mode in which non-transmission regions 1171 and transmission regions 1172 are arranged, there is provided a sweet spot 1175 in which sweet spots 1177 to enable the user to view left view images L displayed on the display panel 1101 and sweet spots 1176 to enable the user to view right view images R displayed on the display panel 1101 are alternately arranged.

The switch mode calculation device 1030 may decide the switch mode so that the barrier or the lens of the three-dimensional image filter 185 can be arranged according to one of the arrangement patterns of the three-dimensional image filters 1110 to 1160 so as to move the sweet spot based on the point where the user is located. For example, in a case in which the left eye of the user is located at the point 1117 and the right eye of the user is located at the point 1118, the switch mode calculation device 1030 may select the switch mode corresponding to the barrier arrangement pattern 1110 so that the sweet spot 1115 is provided. If the left eye of the user moves from the point 1117 to the point 1137, the controller 180 may calculate a control signal to change the switch mode corresponding to the barrier arrangement pattern 1110 to the switch mode that corresponds to the barrier arrangement pattern 1120 so that the sweet spot 1135 is provided, and may output the calculated control signal to the communication controller 1040.

Figure 12:
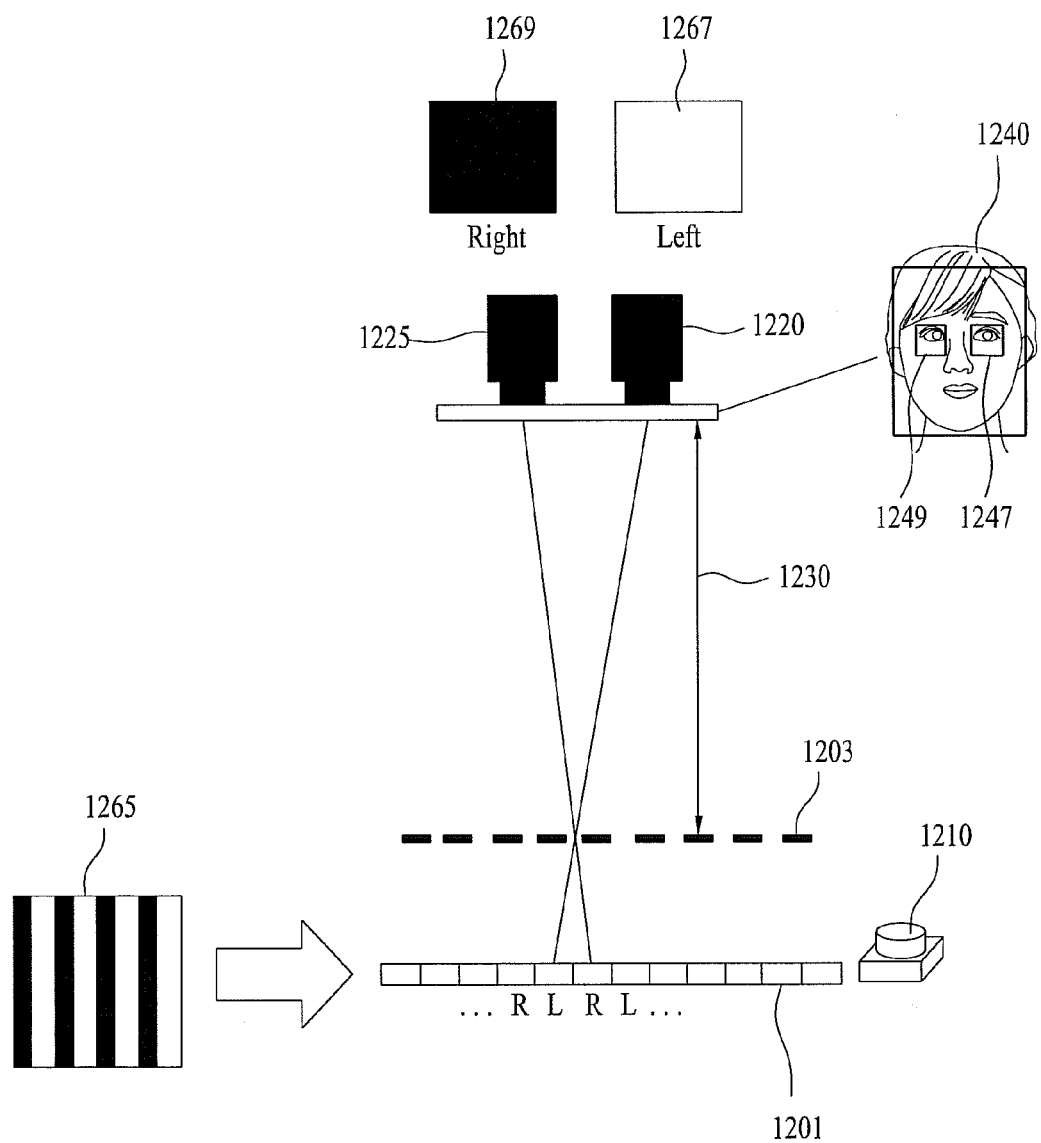
FIG. 12 is a diagram illustrating a calibration method according to an embodiment of the present disclosure.

FIG. 12 is a diagram illustrating a calibration method according to an embodiment of the present disclosure. The calibration method of FIG. 12 may be performed during mass production of the three-dimensional image processing apparatus according to the present disclosure.

A first camera 1220 and a second camera 1225 may be disposed at an optimum viewing distance from a three-dimensional image filter 1203. The gap between the first camera 1220 and the second camera 1225 may be set to correspond to the gap between pupils 1247 and 1249 of a standard face 1240. That is, the first camera 1220 may be located at the left eye 1247 of the standard face 1240, and the second camera 1225 may be located at the right eye 1249 of the standard face 1240. A camera 1210 may be fixed to the three-dimensional image processing apparatus 100 to capture a space in a direction extending from a display device 1201 to the three-dimensional image filter 1203.

The camera 1210 may capture the first camera 1220 and the second camera 1225 and may output a captured image frame to the controller 180. The controller 180 may store the image frame output from the camera 1210 as a reference image frame.

The controller 180 controls the display device 1201 to display an arrangement standard image 1265. The arrangement standard image 1265 may include a left view image 1267 and a right view image 1269. The left view image 1267 may have a white color, and the right view image 1269 may have a black color. While changing the switch mode, the first camera 1220 and the second camera 1225 may capture the arrangement standard image 1265 displayed in each switch mode. The switch mode when brightness difference between the image captured by the first camera 1220 and the image captured by the second camera 1225 is the maximum may be set as the reference switch mode.

In one embodiment, the memory 160 may store the reference switch mode and the reference image frame in an associated fashion. Also, the memory 160 may store the reference switch mode, the position of the first camera 1220, and the position of the second camera 1225 in an associated fashion. Also, the memory 160 may store the reference switch mode and the position of the standard face, the left eye of which is located at the position of the first camera 1220 and the right eye of which is located at the position of the second camera 1225, in an associated fashion. The position of the standard face may be set as a reference user position of mathematical expression 1.

Figure 13:
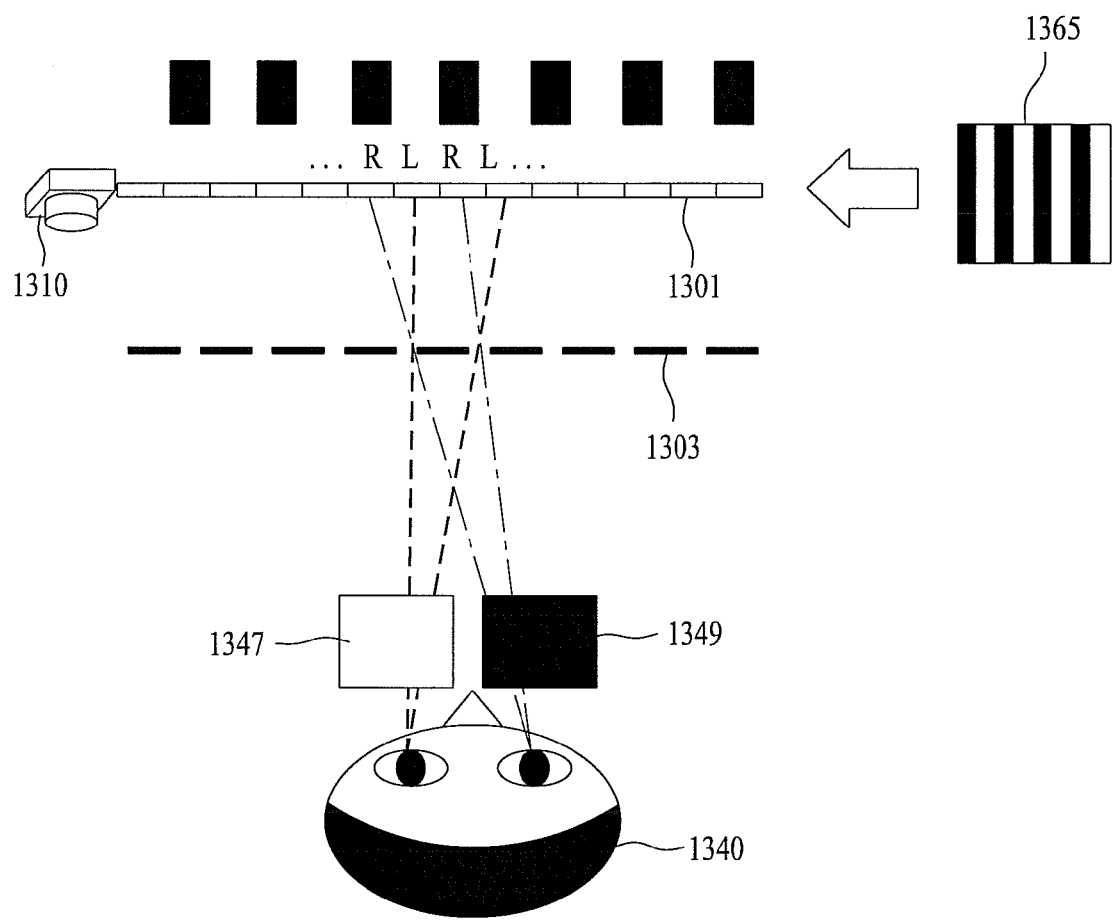
FIG. 13 is a view showing a calibration method according to another embodiment of the present disclosure.

FIG. 13 is a diagram illustrating a calibration method according to another embodiment of the present disclosure. The calibration method of FIG. 13 may be performed by a user.

The interface management device 1010 may detect a user action to request calibration and may control a display device 1301 to display an arrangement standard image 1365 in response to the detected user action. Here, the arrangement standard image 1365 may include a left view image 1347 and a right view image 1349. The left view image 1347 may have a white color, and the right view image 1349 may have a black color.

A camera 1310 may capture the position of a user. The position detection device 1020 may receive image frames captured by the camera 1310 and may detect a position of the user 1340 using the received image frames. The position detection device 1020 may recognize a face region to detect the position of the user 1340. Here, the position detection device 1020 may recognize the face region using an algorithm based on symmetry of a face, an algorithm based on hair color or face color, an algorithm based on the contour of a face, or another appropriate algorithm. Also, the position detection device 1020 may calculate skin color information from the image frames to recognize the face region.

The switch mode calculation device 1030 may calculate a switch mode based on the detected position of the user 1340 and the reference switch mode. Also, the switch mode calculation device 1030 may generate a control signal to enable a three-dimensional image filter 1303 to have the calculated switch mode and may output the generated control signal to the communication controller 1040.

The communication controller 1040 may transmit the control signal generated by the switch mode calculation device 1030 to the three-dimensional image filter drive device 183. The three-dimensional image filter drive device 183 may control the three-dimensional image filter 1303 based on the control signal transmitted from the communication controller 1040. Here, the three-dimensional image filter drive device 183 may control the three-dimensional image filter 1303 to have the calculated switch mode.

In a state in which the three-dimensional image filter 1303 has the calculated switch mode, the user 1340 may alternately close the left eye and the right eye to check whether a white color is securely viewed through the left eye and whether a black color is securely viewed through the right eye. In this way, calibration may be carried out.

At this time, the user 1340 may perform a user action to request movement of the non-transmission region or movement of the lens. When the user action is detected, the interface management device 1010 may change the reference switch mode in response to the detected user action. When the reference switch mode is changed, the switch mode may be calculated based on the current position of the user and the changed reference switch mode, and the three-dimensional image filter drive device 183 may control the three-dimensional image filter 1303 to have the calculated switch mode. In a state in which the three-dimensional image filter 1303 has the calculated switch mode, the user 1340 may alternately close the left eye and the right eye to check whether a white color is securely viewed through the left eye and whether a black color is securely viewed through the right eye. In this way, calibration may be carried out.

If the user 1340 moves during calibration, the switch mode calculation device 1030 may calculate the switch mode based on the moved position of the user and the reference switch mode, and the three-dimensional image filter drive device 183 may control the three-dimensional image filter 1303 to have the calculated switch mode.

FIG. 14 is a diagram illustrating a calibration method according to a further embodiment of the present disclosure. Here, an arrangement standard image 1465 may be displayed instead of the arrangement standard image 1365 in the calibration method of FIG. 13.

The arrangement standard image 1465 may include a left view image 1447 and a right view image 1449. The left view image 1447 may have an X-shaped pattern, and the right view image 1449 may have a circular pattern.

In a state in which the three-dimensional image filter 185 has a switch mode 1403, the user 1340 may alternately close the left eye and the right eye to check whether the X-shaped pattern is securely viewed through the left eye and whether the circular pattern is securely viewed through the right eye. In this way, calibration is carried out.

Figure 15A:
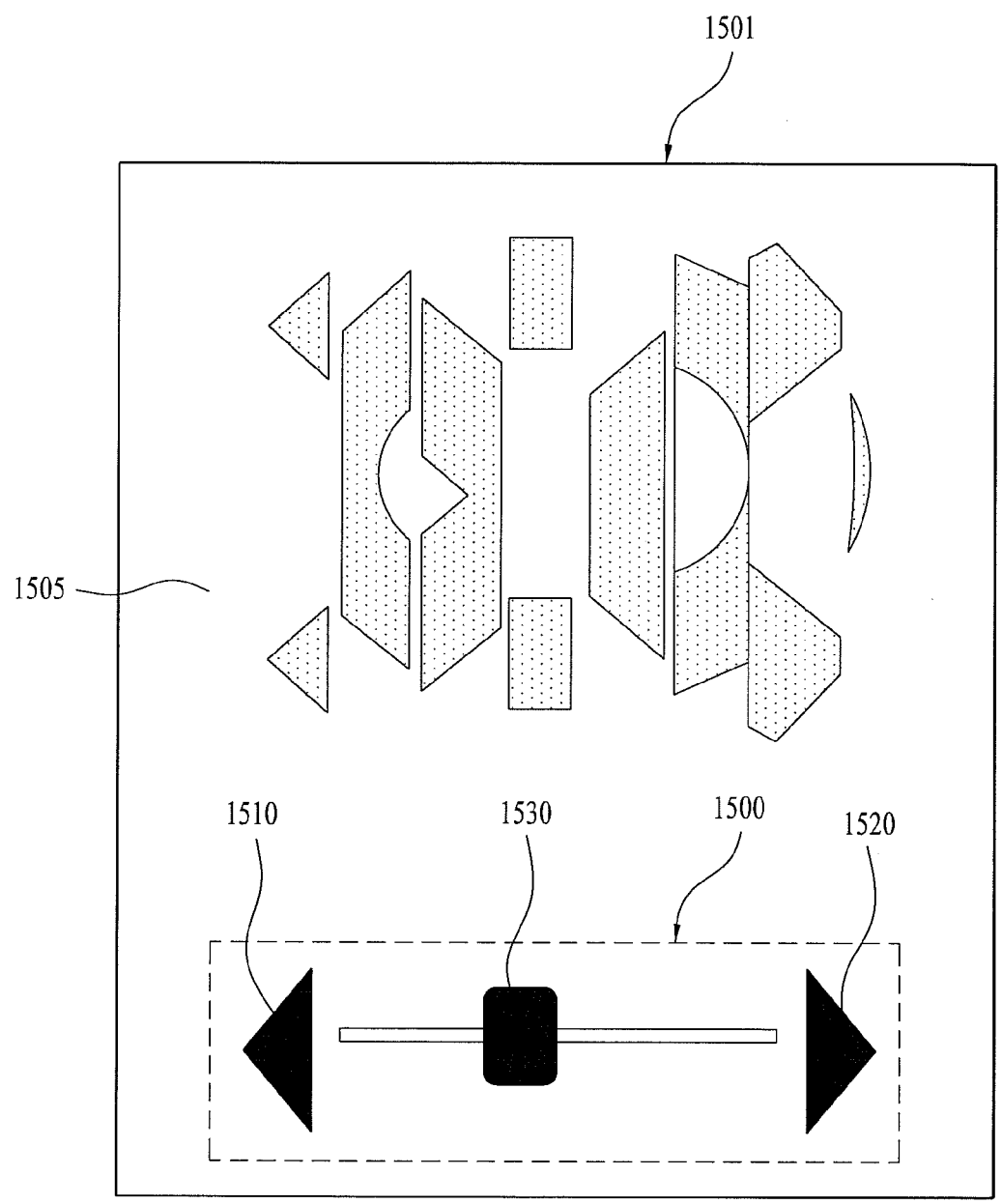
FIGS. 15A and 15B are diagrams of a graphical user interface (GUI) for calibration setting according to an embodiment of the present disclosure.
Figure 15B:
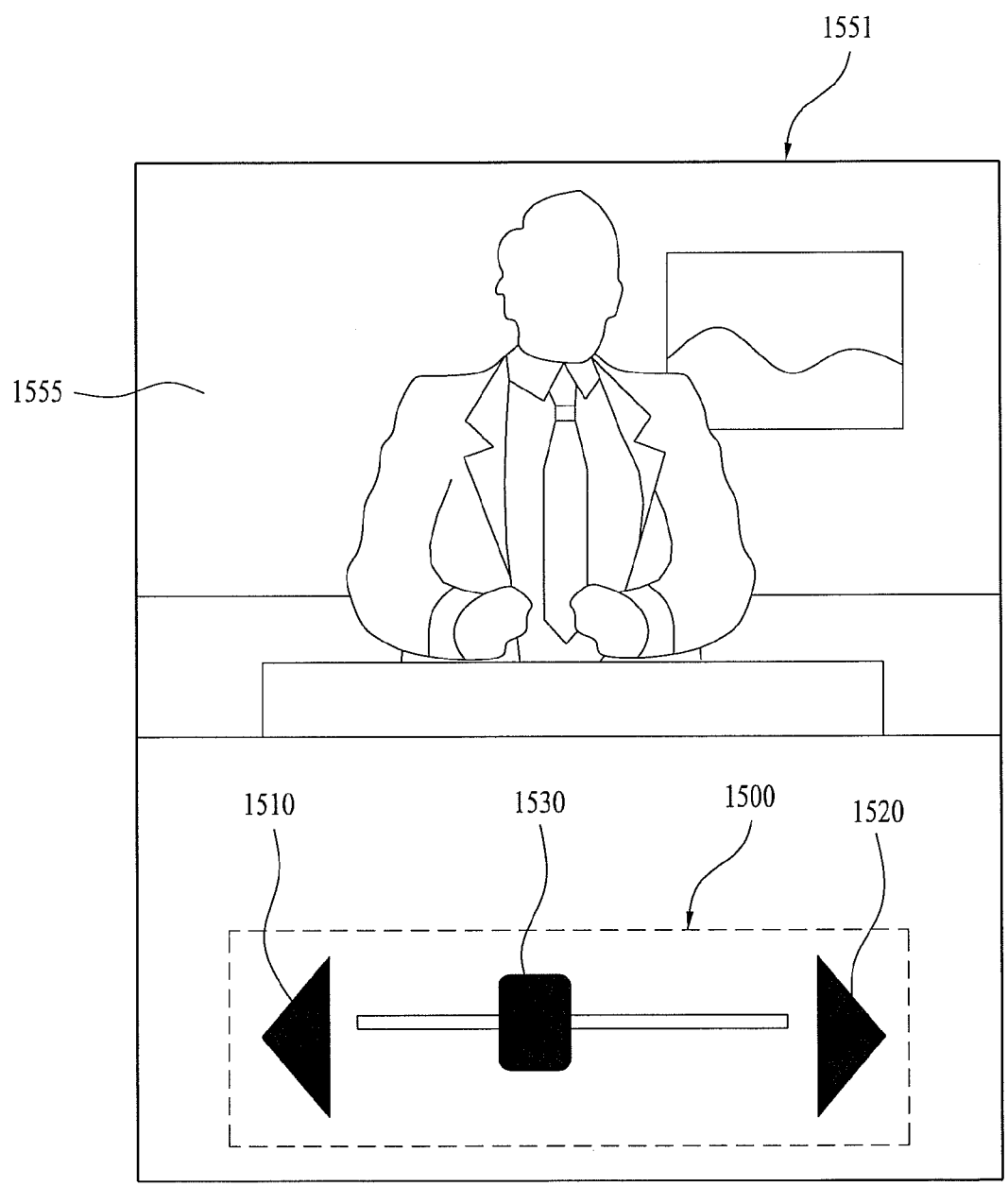

FIGS. 15A and 15B are diagrams of a graphical user interface (GUI) for calibration setting according to an embodiment of the present disclosure. The interface management device 1010 may detect user action to request calibration (or calibration setting) and may control the display device 151 to display a graphical user interface (GUI) 1500 for calibration setting in response to the detected user action. The GUI 1500 may be displayed in a state in which the GUI 1500 is overlaid on an arrangement standard image 1505. Also, the interface management device 1010 may control the display device 151 to simultaneously display the GUI 1500 and the arrangement standard image 1505 in response to user action to request calibration setting. Also, the GUI 1500 may be displayed in a state in which the GUI 1500 is overlaid on an image 1505 displayed when calibration setting is requested.

Here, the image 1505 may be an image included in a broadcast signal received by the broadcast reception module 111, an image included in a wireless signal received by the mobile communication module 112, an image included in a wireless signal received by the wireless Internet module 113, an image included in a wireless signal received by the short range communication module 114, an image included in data received by the interface device 170, an image stored in the memory 160, or an image obtained by another appropriate means.

The GUI 1500 may include a left movement button 1510, a right movement button 1520, and an indicator 1530. The user may push the left movement button 1510 to perform user action to request movement of the barrier to the left. Also, the user may push the right movement button 1520 to perform user action to request movement of the barrier to the right.

If the user action to push the left movement button 1510 is detected, the interface management device 1010 may change the reference switch mode to the first or subsequent switch mode from the reference switch mode before the reference switch mode. If the user action to push the right movement button 1520 is detected, the interface management device 1010 may change the reference switch mode to the first or subsequent switch mode from the reference switch mode before the reference switch mode.

The indicator 1530 indicates the current position of the reference switch mode. When the left movement button 1510 is pushed, the indicator 1530 may move to the left by a predetermined distance. When the right movement button 1520 is pushed, the indicator 1530 moves to the right by a predetermined distance.

The user may drag the indicator 1530 to perform a user action to control movement of the barrier. The interface management device 1010 may detect the user action and may change the reference switch mode based on a movement amount indicated by the user action. Here, the movement amount may be a length by which the indicator 1530 is dragged or may be proportional to the length dragged relative to the length of the scroll bar.

Figure 16A:
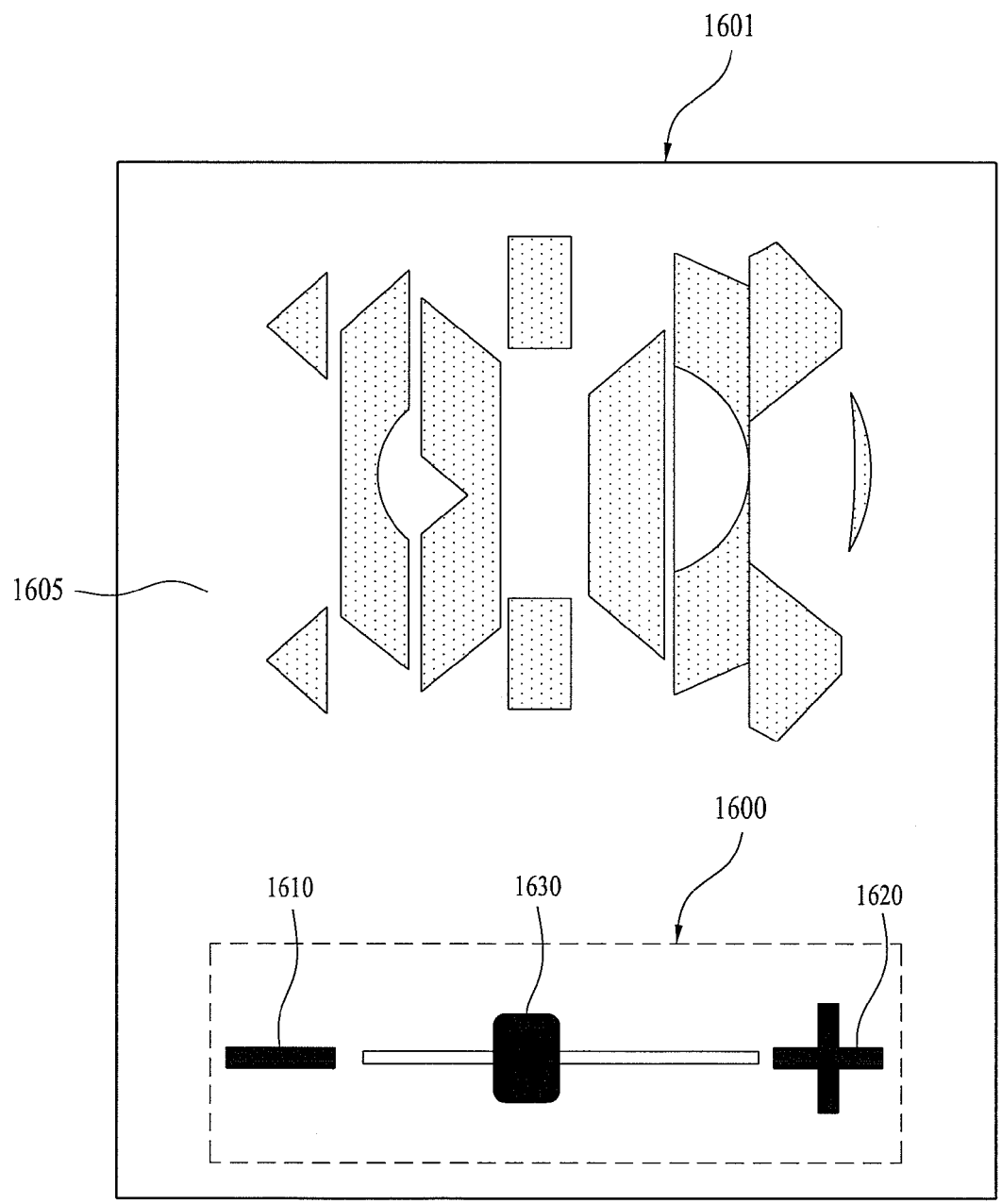
FIGS. 16A and 16B are diagrams of a GUI for calibration setting according to another embodiment of the present disclosure.
Figure 16B:
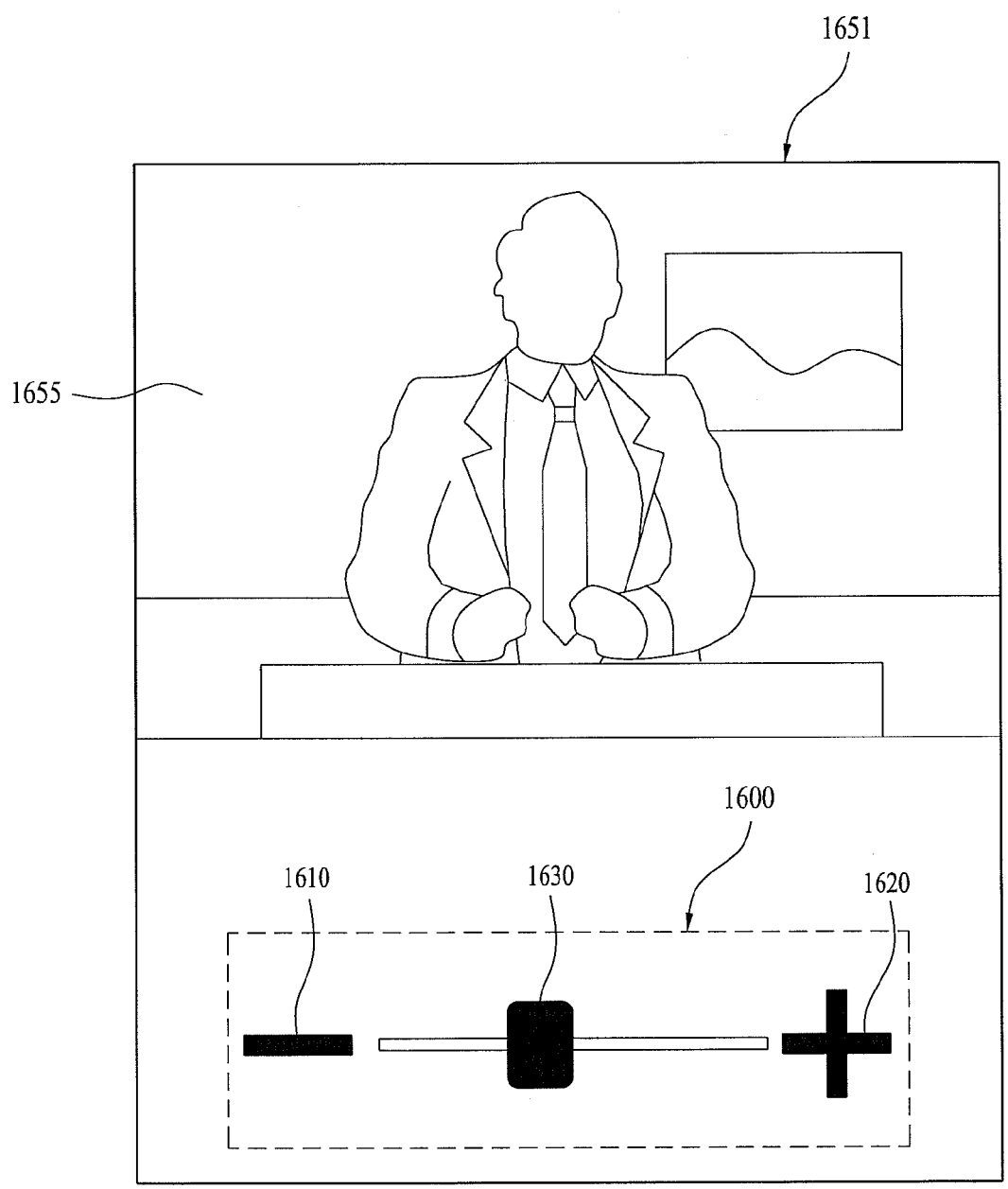

FIGS. 16A and 16B are diagrams of a GUI for calibration setting according to another embodiment of the present disclosure. The interface management device 1010 may detect user action to request calibration setting and may control the display device 151 to display a graphical user interface (GUI) 1600 for calibration setting in response to the detected user action. The GUI 1600 may be displayed in a state in which the GUI 1600 is overlaid on an arrangement standard image 1601. Also, the interface management device 1010 may control the display device 151 to simultaneously display the GUI 1600 and the arrangement standard image 1601 in response to user action to request calibration setting. Also, the GUI 1600 may be displayed in a state in which the GUI 1600 is overlaid on an image 1605 displayed when calibration setting is requested.

Here, the image 1605 may be an image included in a broadcast signal received by the broadcast reception module 111, an image included in a wireless signal received by the mobile communication module 112, an image included in a wireless signal received by the wireless Internet module 113, an image included in a wireless signal received by the short range communication module 114, an image included in data received by the interface device 170, an image stored in the memory 160, or obtained through another appropriate means.

The GUI 1600 may include a minus button 1610, a plus button 1620, and an indicator 1630. The user may push the minus button 1610 to perform a user action to request movement of the barrier to the left. Also, the user may push the plus button 1620 to perform a user action to request movement of the barrier to the right. Here, the minus button 1610, the plus button 1620, and the indicator 1630 may correspond to the left movement button 1510, the right movement button 1520, and the indicator 1530 of FIG. 15, respectively, and therefore, a detailed description thereof will be omitted.

FIG. 17 is a flow chart of a calibration method according to an embodiment of the present disclosure. The interface management device 1010 may detect an input (e.g., a user action) to request calibration setting, in step S100. In response to the input to request calibration setting, the display device 151 may display a calibration image, in step S105. Here, the calibration image may be an arrangement standard image or a three-dimensional image having a prescribed perceived depth (e.g., a prescribed 3D effect).

In one embodiment, at step S105, the display device 151 may display one GUI selected from among the GUI 1500 of FIG. 15A or the GUI 1600 of FIG. 16A. That is, at step S105, the display device 151 may display a screen image 1501 of FIG. 15A or a screen image 1601 of FIG. 16A.

In one embodiment, at step S105, the display device 151 may display an image before the input to request calibration setting is detected or may display one GUI selected from among the GUI 1500 of FIG. 15A or the GUI 1600 of FIG. 16A on the image in an overlaid fashion. That is, at step S105, the display device 151 may display a screen image 1551 of FIG. 15A or a screen image 1651 of FIG. 16A.

The position detection device 1020 may detect the current position of a user, in step S110. The position detection device 1020 may receive image frames in which the user image has been captured from the camera 121 and may detect a position of the user using the received image frames. The position detection device 1020 may recognize a face region or a facial feature to detect the position of the user.

The switch mode calculation device 1030 may calculate a switch mode based on the current position of the user detected by the position detection device 1020 and the reference switch mode, in step S115. The switch mode calculation device 1030 may calculate the switch mode using mathematical expression 1 above. Here, the reference switch mode may be set during manufacture of the three-dimensional image processing apparatus 100 or may be changed by the interface management device 1010. Also, the reference switch mode may be stored in the memory 160.

In one embodiment, the switch mode calculation device 1030 may generate a control signal to control movement of the non-transmission region of the three-dimensional image filter to a position indicated by the calculated switch mode and may output the generated control signal to the communication controller 1040. In one embodiment, the switch mode calculation device 1030 may generate a control signal to control movement of the lens of the three-dimensional image filter to a position indicated by the calculated switch mode and may output the generated control signal to the communication controller 1040.

The communication controller 1040 may transmit the control signal generated by the switch mode calculation device 1030 to the three-dimensional image filter drive device 183. The three-dimensional image filter drive device 183 may control the three-dimensional image filter 185 to have the switch mode calculated by the switch mode calculation device 1030, in step S120. Here, the three-dimensional image filter drive device 183 may control the three-dimensional image filter 185 based on the control signal transmitted from the communication controller 1040.

In one embodiment, the three-dimensional image filter drive device 183 may control movement of the non-transmission region so that the three-dimensional image filter 185 has the switch mode calculated by the switch mode calculation device 1030. In one embodiment, the three-dimensional image filter drive device 183 may control movement of the lens so that the three-dimensional image filter 185 has the switch mode calculated by the switch mode calculation device 1030. In one embodiment, the controller 180 may control the display position of the calibration image (e.g., adjust position of the left eye and right eye images based on the detected position of the user's eyes and position of the three-dimensional image filter 185). Moreover, a combination of the calibration image and the image filter 185 may be adjusted to calibrate the perceived 3D image.

Moreover, the steps S100 to S120 may be performed automatically. For example, upon initialization of the three-dimensional display device, initial calibration may be automatically carried out using the prestored positional values for the calibration image and three-dimensional image filter position. This calibration process may be performed upon detection of a user for the first time. Additional adjustments may then be made by the user in steps S125 through S150, as described hereinafter.

The interface management device 1010 may detect an input (e.g., a user action) to request movement of the non-transmission region or the lens, in step S125. Here, the input may be input through the GUI 1500 of FIG. 15 or the GUI 1600 of FIG. 16. If the input is not received within a prescribed amount of time, or if an input to cancel calibration is received, the process may end. In response to the input to request movement of the non-transmission region of the lens, the interface management device 1010 may change the reference switch mode, in step S130.

Here, the interface management device 1010 may change the reference switch mode based on a movement amount indicated by the user action. That is, in a case in which the movement amount indicates a value of −2, the interface management device 1010 may change the reference switch mode to the second switch mode from the reference switch mode before the reference switch mode. For example, when user action to request movement of the barrier by −2 is detected in a state in which the reference switch mode is the fifth switch mode (Mode 5) of FIG. 8B, the reference switch mode may be changed to the third switch mode (Mode 3) of FIG. 8B.

Also, in a case in which the movement amount indicates a value of +2, the interface management device 1010 changes the reference switch mode to the second switch mode from the reference switch mode after the reference switch mode. For example, when the input to request movement of the non-transmission region by +2 may be detected in a state in which the reference switch mode is the fifth switch mode (Mode 5) of FIG. 8B, the reference switch mode may be changed to the seventh switch mode (Mode 7) of FIG. 8B.

The switch mode calculation device 1030 may calculate a switch mode using the current position of the user detected by the position detection device 1020 and the reference switch mode changed at step S130, in step S135. The camera 121 may continuously capture a user image, and the position detection device 1020 may continuously detect the position of the user based on image frames captured by the camera 121. That is, the switch mode calculated at step S135 may be one that has been calculated using the current position of the user detected by the position detection device 1020 upon executing step S135.

The three-dimensional image filter drive device 183 may control the three-dimensional image filter 185 to have the switch mode calculated at step S135, in step S140. Here, the non-transmission region or the lens may be moved based on the calculated switch mode. In one embodiment, the controller 180 may control the display position of the calibration image (e.g., adjust position of the left eye and right eye images based on the user input for image adjustment and the detected position of the user's eyes and position of the three-dimensional image filter 185). Moreover, a combination of the calibration image and the image filter 185 may be adjusted to calibrate the perceived 3D image.

The interface management device 1010 may determine whether user action to request completion of calibration setting has been detected, in step S145. Upon determining that the user action to request completion of calibration setting has been detected, the interface management device 1010 may stop the display of the calibration image and may store the reference switch mode, in step S150. Here, the reference switch mode changed in step S130 may be stored in the memory 160.

Upon determining that the user action to request completion of calibration setting has not been detected, for example, based on a predetermined amount of time or on user input, step S110 may be executed again. In this case, the reference switch mode used to calculate the switch mode at step S115 may be one that has been changed at step S140.

As is apparent from the above description, in the three-dimensional image processing apparatus and calibration method of the same according to the present disclosure, a calibration service is provided to adjust the three-dimensional image filter to the positions of eyes of a user. Consequently, it is possible to customize a three-dimensional image filter for a prescribed user. Also, the three-dimensional image filter may be adjusted based on a detected position of the user, even when the user is in motion, using face tracking. Consequently, it is possible to adjust the three-dimensional image filter to the positions of eyes of the user even during movement of the user.

As embodied and broadly described herein, a calibration method of a three-dimensional image processing apparatus may include adjusting the position of a non-transmission region of a three-dimensional image filter based on a current position of a user and a reference switch mode, detecting user action to request movement of the non-transmission region, and changing the reference switch mode in response to the detected user action and adjusting the position of the non-transmission region of the three-dimensional image filter based on the changed reference switch mode. The step of adjusting the position of the non-transmission region of the three-dimensional image filter may include controlling supply of power to at least one barrier of the three-dimensional image filter.

The step of adjusting the position of the non-transmission region of the three-dimensional image filter may include calculating switch modes using the current position of the user and the reference switch mode and adjusting the position of the non-transmission region of the three-dimensional image filter based on the calculated switch modes. The number of the switch modes may be set based on the number of channels. Also, the number of the switch modes may be set based on the number of corresponding barriers per pixel or sub-pixel of a display device.

The calibration method may further include detecting user action to request calibration setting and displaying a calibration image in response to the detected user action. The calibration image may include two or more view images.

The calibration method may further include detecting user action to request calibration setting and displaying a graphical user interface (GUI) for calibration setting in response to the detected user action, wherein the user action to request movement of the non-transmission region may be user action to push a button of the GUI.

The calibration method may further include detecting user action to request completion of calibration setting and storing the changed reference switch mode in response to the detected user action.

The calibration method may further include sensing a changed position of the user and adjusting the position of the non-transmission region of the three-dimensional image filter based on the sensed position of the user and the reference switch mode.

In another aspect of the present disclosure, a three-dimensional image processing apparatus may include a display device to display two or more view images, a three-dimensional image filter, disposed at the front of the display device, including transmission regions and non-transmission regions which are alternately arranged, and a controller configured to adjust positions of the non-transmission regions of the three-dimensional image filter based on a current position of a user and a reference switch mode, to change the reference switch mode in response to a user action to request movement of the non-transmission regions upon detecting the user action, and to adjust the positions of the non-transmission regions of the three-dimensional image filter based on the changed reference switch mode.

In another aspect of the present disclosure, a three-dimensional image processing apparatus may include a receiving device configured to receive captured image frames of a user and a controller configured to set a current position of the user using the received image frames, to adjust a position of a non-transmission region of a three-dimensional image filter based on the set current position of the user and a reference switch mode, to change the reference switch mode in response to a user action to request movement of the non-transmission region upon detecting the user action, and to adjust the position of the non-transmission region of the three-dimensional image filter based on the changed reference switch mode.

In another aspect of the present disclosure, a calibration method of a three-dimensional image processing apparatus may include adjusting a position of a lens of a three-dimensional image filter based on a current position of a user and a reference switch mode, detecting a user action to request movement of the lens, and changing the reference switch mode in response to the detected user action and adjusting the position of the lens of the three-dimensional image filter based on the changed reference switch mode. Here, the lens may be formed as a result of change in a refractive index of a liquid crystal by voltage applied to a plurality of device electrodes. Also, distribution of the applied voltage may be shifted in a per device electrode basis to move the lens.

In a further aspect of the present disclosure, a three-dimensional image processing apparatus may include a display device configured to display two or more view images, a three-dimensional image filter disposed at the front of the display device, the three-dimensional image filter comprising a plurality of lenses, and a controller configured to adjust positions of the lenses based on a current position of a user and a reference switch mode, to change the reference switch mode in response to a user action to request movement of the lenses upon detecting the user action, and to adjust the positions of the lenses based on the changed reference switch mode.

Also, the present disclosure may be realized in recording media readable by computers as codes readable by the computers. The recording media readable by the computers include all kinds of recording devices to store data readable by the computers. Examples of the recording media readable by the computers include a ROM, a RAM, a CD-ROM, a magnetic tape, a floppy disk, and an optical data storage device. Also, the present disclosure may be realized in the form of a carrier wave (for example, transmission through the Internet). Also, the recording media readable by the computers may be stored in computers connected via a network in a distributed fashion as codes readable by the computers so that the computers can execute the codes.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A three-dimensional image processing apparatus comprising:
   a display configured to display a left eye image and a right eye image to create a perceived three-dimensional view;
   a three-dimensional image filter positioned a prescribed distance relative to the display for adjusting the perceived three-dimensional view of the left and right eye images;
   a camera to detect a position of a user; and
   a controller configured to adjust the three-dimensional image filter or a position of the left or right eye images based on the detected position of the user,
   wherein the three-dimensional image filter includes a plurality of translucent regions and a plurality of opaque regions, the positions of the plurality of translucent and opaque region being adjustable along a length of the three-dimensional image filter,
   wherein the controller generates a first perceived three-dimensional view based on a first relative position of the translucent and opaque regions to the position of the left and right images and the detected position of the user, determines a second relative position of the translucent and opaque regions to the position of the left and right images and the detected position of the user, and generates a second perceived three-dimensional view based on the second relative position of the translucent and opaque regions,
   wherein the three-dimensional image filter includes a lens positioned to correspond to a prescribed number of the translucent and opaque regions, and
   wherein the controller controls a voltage applied to a plurality of electrodes to adjust a refractive index of a liquid crystal in order to form the lens, the electrodes corresponding to one of the translucent or opaque regions.

2. The three-dimensional image processing apparatus of claim 1, wherein the controller determines the first relative position of the translucent and opaque regions based on a default position of the translucent and opaque regions.

3. The three-dimensional image processing apparatus of claim 2, wherein the second relative position of the translucent and opaque regions is saved as the default position.

4. The three-dimensional image processing apparatus of claim 1, wherein the controller determines the second relative position of the translucent and opaque regions based on an input to move the translucent and opaque regions on the three-dimensional filter.

5. The three-dimensional image processing apparatus of claim 1, wherein the controller detects a position of a left eye and a right eye of a user, and determines the first and second relative positions of the translucent and opaque regions based on the detected positions of the left eye and the right eye of the user.

6. The three-dimensional image processing apparatus of claim 5, wherein the position of the left eye and the right eye of the user is detected using an image of the user captured through the camera.

7. The three-dimensional image processing apparatus of claim 1, wherein a number of positions for the translucent and opaque regions of the three-dimensional image filter are based on a number of the translucent and opaque regions.

8. The three-dimensional image processing apparatus of claim 7, wherein the number of positions for the translucent and opaque regions are based on the number of corresponding opaque and translucent regions per pixel or sub-pixel of the display.

9. The three-dimensional image processing apparatus of claim wherein the left and right eye images are displayed in response to a request to calibrate the three-dimensional image processing apparatus.

10. The three-dimensional image processing apparatus of claim 9, wherein the controller generates the first perceived three-dimensional view in response to the request to calibrate the three-dimensional image processing apparatus a first amount, and the controller generates the second perceived three-dimensional view in response to a second request to further calibrate the three-dimensional image processing apparatus a second amount.

11. The three-dimensional image processing apparatus of claim 9, wherein the controller generates a graphical user interface (GUI) for calibrating the three-dimensional image filter, the GUI including a button for moving the opaque region of the three-dimensional image filter, wherein the second relative position of the translucent and opaque regions are moved based on the selection of the button.

12. The three-dimensional image processing apparatus of claim 11, wherein the first relative position of the translucent and opaque regions is based on a default position, and the second relative position of the translucent and opaque regions is saved as a new default position of the translucent and opaque regions.

13. The three-dimensional image processing apparatus of claim 1, wherein the controller controls the movement of the translucent and opaque regions of the three-dimensional image filter by controlling a voltage applied to at least one barrier of the three-dimensional image filter.

14. The three-dimensional image processing apparatus of claim 1, wherein the controller shifts a distribution of the applied voltage to move the lens.

15. A three-dimensional image processing apparatus comprising:
   a display configured to display a three-dimensional image having a left eye image and a right eye image;
   a three-dimensional image filter positioned a prescribed distance relative to the display;
   a camera to detect a position of a user; and
   a controller configured to adjust the three-dimensional image filter or a position of the left or right eye images based on the detected position of the user,
   wherein the three-dimensional image filter includes a plurality of translucent regions and a plurality of opaque regions positioned relative to the display, the relative positions of the plurality of translucent and opaque region being adjustable on the three-dimensional image filter,
   wherein the controller is configured to display a user input interface to receive a user input for calibrating the three-dimensional image filter or the position of the left or right eye images, and to calibrate the three-dimensional image filter by changing a position of the plurality of translucent and opaque regions or the position of the left or right eye images relative to the detected position of the user based on the user input,
   wherein the three-dimensional image filter includes a lens positioned to correspond to a prescribed number of the translucent and opaque regions, and
   wherein the controller controls a voltage applied to a plurality of electrodes to adjust a refractive index of a liquid crystal in order to form the lens, the electrodes corresponding to one of the translucent or opaque regions.

16. The three-dimensional image processing apparatus of claim 15, wherein the controller changes the position of the plurality of translucent and opaque regions or the position of the left or right eye images based on a default position of the translucent and opaque regions or the left or right eye images.

17. The three-dimensional image processing apparatus of claim 16, wherein the changed position of the translucent and opaque regions or the left or right images is saved as the default position.

18. The three-dimensional image processing apparatus of claim 15, wherein the user input interface is a graphical user interface (GUI) for calibrating the three-dimensional image filter, the GUI including a button for moving the opaque region of the three-dimensional image filter, wherein the changed position of the translucent and opaque regions or the left or right images are moved based on the selection of the button.

* * * * *